US012598294B2

(12) United States Patent
Jin et al.

(10) Patent No.: US 12,598,294 B2
(45) Date of Patent: *Apr. 7, 2026

(54) METHOD AND DEVICE FOR ENCODING OR DECODING IMAGE BY MEANS OF BLOCK MAP

(71) Applicant: SAMSUNG ELECTRONICS CO., LTD., Suwon-si (KR)

(72) Inventors: Bo-ra Jin, Yongin-si (KR); Min-woo Park, Yongin-si (KR); Chan-yul Kim, Seongnam-si (KR); Jung-hye Min, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,110

(22) Filed: Jul. 8, 2024

(65) Prior Publication Data

US 2024/0364872 A1     Oct. 31, 2024

Related U.S. Application Data

(63) Continuation of application No. 16/340,877, filed as application No. PCT/KR2016/011289 on Oct. 10, 2016, now Pat. No. 12,063,349.

(51) Int. Cl.
*H04N 19/119* (2014.01)
*H04N 19/105* (2014.01)
(Continued)

(52) U.S. Cl.
CPC ......... *H04N 19/105* (2014.11); *H04N 19/119* (2014.11); *H04N 19/129* (2014.11);
(Continued)

(58) Field of Classification Search
CPC .. H04N 19/105; H04N 19/119; H04N 19/129; H04N 19/137; H04N 19/176; H04N 19/44; H04N 19/51; H04N 19/52
(Continued)

(56) References Cited

U.S. PATENT DOCUMENTS 8,885,707 B2 11/2014 Adachi et al.
9,137,536 B2  9/2015 Jung et al.
(Continued)

FOREIGN PATENT DOCUMENTS

CN     101055638 A     10/2007
CN     102474613 A      5/2012
(Continued)

OTHER PUBLICATIONS

Communication (Decision to Refuse) dated Oct. 11, 2022, issued by the European Patent Office in counterpart European Application No. 16918528.7.
(Continued)

*Primary Examiner* — Albert Kir
(74) *Attorney, Agent, or Firm* — Sughrue Mion, PLLC

(57) ABSTRACT

Provided are a method and device for encoding or decoding an image by using a block map. In the method and device for decoding an image according to an embodiment set forth herein, a bitstream of an encoded image is received, one or more blocks in a picture are determined using split information obtained from the bitstream, a block map indicating whether or not a previous block among the one or more blocks has been decoded is determined, a neighboring region which is available to be referred to for a current block to be decoded in a certain scan order among the one or more blocks is determined, and the current block is decoded based on the neighboring region which is available to be referred to.

3 Claims, 21 Drawing Sheets

(51) Int. Cl.
    *H04N 19/129*     (2014.01)
    *H04N 19/137*     (2014.01)
    *H04N 19/169*     (2014.01)
    *H04N 19/176*     (2014.01)
    *H04N 19/44*     (2014.01)
    *H04N 19/51*     (2014.01)
    *H04N 19/52*     (2014.01)
    *H04N 19/96*     (2014.01)
(52) U.S. Cl.
    CPC ......... *H04N 19/137* (2014.11); *H04N 19/176* (2014.11); *H04N 19/44* (2014.11); *H04N 19/51* (2014.11); *H04N 19/52* (2014.11)
(58) Field of Classification Search
    USPC .......................... 375/240.16, 240.24, 240.02
    See application file for complete search history.

(56) References Cited

U.S. PATENT DOCUMENTS

| | | | |
|---|---|---|---|
| 9,277,239 | B2 | 3/2016 | Min et al. |
| 9,420,293 | B2 | 8/2016 | Song et al. |
| 9,578,329 | B2 | 2/2017 | Yang et al. |
| 10,116,934 | B2 | 10/2018 | Zan et al. |
| 10,200,710 | B2 | 2/2019 | Kim |
| 10,334,263 | B2 | 6/2019 | Park et al. |
| 11,589,050 | B2 | 2/2023 | Lin et al. |
| 2009/0006243 | A1 | 1/2009 | Davis et al. |
| 2011/0038412 | A1 | 2/2011 | Jung et al. |
| 2011/0188768 | A1 | 8/2011 | Pateux et al. |
| 2012/0008676 | A1 | 1/2012 | Lee et al. |
| 2013/0064292 | A1 | 3/2013 | Song et al. |
| 2013/0070854 | A1 | 3/2013 | Wang et al. |
| 2013/0308708 | A1 | 11/2013 | Sugio et al. |
| 2014/0211857 | A1 | 7/2014 | Sugio et al. |
| 2014/0214686 | A1 | 7/2014 | Wu |
| 2014/0233642 | A1 | 8/2014 | Lin |
| 2017/0347095 | A1* | 11/2017 | Panusopone ........... H04N 19/70 |
| 2018/0070110 | A1 | 3/2018 | Chuang et al. |
| 2018/0103268 | A1 | 4/2018 | Huang et al. |
| 2018/0288446 | A1 | 10/2018 | An et al. |
| 2018/0316934 | A1 | 11/2018 | Nam et al. |
| 2019/0149836 | A1 | 5/2019 | Moon et al. |
| 2019/0246101 | A1* | 8/2019 | Jin ......................... H04N 19/44 |
| 2019/0327476 | A1 | 10/2019 | Lee et al. |
| 2020/0413058 | A1 | 12/2020 | Moon et al. |
| 2020/0413102 | A1 | 12/2020 | Hsiang et al. |
| 2021/0037226 | A1* | 2/2021 | Kim ..................... H04N 19/134 |
| 2021/0051332 | A1 | 2/2021 | Karczewicz et al. |
| 2021/0058617 | A1 | 2/2021 | Reuze et al. |
| 2021/0076034 | A1* | 3/2021 | Misra .................. H04N 19/176 |
| 2021/0105481 | A1 | 4/2021 | Kim et al. |
| 2021/0112247 | A1 | 4/2021 | Hsiang et al. |
| 2021/0152825 | A1 | 5/2021 | Reuze et al. |
| 2021/0185362 | A1 | 6/2021 | Zhang et al. |
| 2021/0235100 | A1 | 7/2021 | Lee |
| 2021/0314567 | A1 | 10/2021 | Huang et al. |
| 2021/0377531 | A1 | 12/2021 | Zhang et al. |
| 2022/0053188 | A1* | 2/2022 | Lim ....................... H04N 19/91 |
| 2022/0150492 | A1 | 5/2022 | Deng et al. |
| 2022/0248009 | A1 | 8/2022 | Xu et al. |
| 2022/0286714 | A1 | 9/2022 | Lin et al. |
| 2022/0400257 | A1 | 12/2022 | Chang et al. |
| 2023/0231992 | A1 | 7/2023 | Chen et al. |

FOREIGN PATENT DOCUMENTS

| | | | |
|---|---|---|---|
| CN | 102737341 | A | 10/2012 |
| CN | 102907100 | A | 1/2013 |
| CN | 104488272 | A | 4/2015 |
| CN | 104539959 | A | 4/2015 |
| CN | 104717510 | A | 6/2015 |
| CN | 105264890 | A | 1/2016 |
| KR | 10-2008-0000562 | A | 1/2008 |
| KR | 10-2011-0126485 | A | 11/2011 |
| KR | 10-2013-0002243 | A | 1/2013 |
| KR | 10-2015-0000851 | A | 1/2015 |
| KR | 10-2015-0003690 | A | 1/2015 |
| WO | 2014/120367 | A1 | 8/2014 |
| WO | 2015035449 | A1 | 3/2015 |

OTHER PUBLICATIONS

Communication (Minutes of Oral Proceedings) dated Oct. 12, 2022, issued by the European Patent Office in counterpart European Application No. 16918528.7.
Communication dated Apr. 6, 2022 issued by the Intellectual Property India Patent Office in application No. 201927015558.
Communication dated Aug. 23, 2019, from the European Patent Office in counterpart European Application No. 16918528.7.
Communication dated Jul. 14, 2020, issued by the Korean Intellectual Property Office in Korean Application No. 10-2019-7008603.
Communication dated Mar. 3, 2021 issued by the Intellectual Property India Patent Office in application No. 201927015558.
Communication dated May 29, 2020, from the European Patent Office in European Application No. 16918528.7.
Communication dated Nov. 25, 2022, issued by the India Intellectual Property Office in Indian Patent Application No. 202228032411.
Communication dated Nov. 26, 2021 issued by Intellectual Property Office of the P.R.China in application No. 201680091331.8.
Communication dated Sep. 20, 2022, issued by the Korean Intellectual Property Office in Korean Patent Application No. 10-2022-7024031.
Communication dated Sep. 29, 2021 issued by the Korean Intellectual Property Office in application No. 10-2021-7023413.
Communication issued Mar. 13, 2023 from the Korean Patent Office in KR Application No. 10-2022-7024031.
Communication issued Mar. 16, 2023 from the Indian Patent Office in Indian Patent Application No. 202228032428.
European Search Report, dated Feb. 15, 2023, issued by the European Patent Office, Application No. 22212646.8.
Indian Office Action, dated Dec. 8, 2022, issued by the Intellectual Property India, Application No. 202228032412.
Indian Office Action, dated Dec. 8, 2022, issued by the Intellectual Property India, Application No. 202228032423.
International Search Report (PCT/ISA/210) dated Jul. 3, 2017 issued by the International Searching Authority in International Application No. PCT/KR2016/011289.
Jianle Chen et al, "Algorithm Description of Joint Exploration Test Model 1," XP030268838, Joint Video Exploration Team (JVET), Oct. 2015, (27 Total Pages).
Krishna Rapaka et al. "On parallel processing capability of intra block copy" JCT-VC 19th Meeting: Strasbourg, FR, Oct. 17-24, 2014, (8 pages total) XP030117009.
Li, X., et al., "Multi-Type-Tree", Joint Video Exploration Team (JVET) of ITU-T SG 16 WP 3 and ISO/IEC JTC 1/SC 29/WG 11, Oct. 15-21, 2016, JVET-D0117, pp. 1-3.
Mathias Wien "4.2 Spatial Coding Structure, 7.2 Motion Vector Representation" High Efficiency Video Coding—Coding Tools and Specification, Oct. 8, 2014, (pp. 114-124, 184-190) XP055613067.
Notice of Allowance issued Dec. 23, 2020 by the Korean Intellectual Property Office in counterpart Korean Application No. 10-2019-7008603.
Communication dated Jan. 4, 2023, issued by the National Intellectual Property Administration PRC, Application No. 201680091331.8.
Stephan Wenger et al. "Flexible Macrobook Ordering (FMO) Proposal" JVT 3rd Meeting: Fairfax, Virginia, USA, May 6-10, 2002 (22 pages total) XP030005198.
Vivienne Sze et al., "High Efficiency Video Coding (HEVC)", Springer, Jul. 4, 2014, pp. 1-375 (390 pages total).
Vivienne Sze et al., "High Efficiency Video Coding (HEVC): Algorithms and Architectures" Integrated Circuits and Systems, Springer International Publishing, Switzerland, 2014, DOI: 10.1007/978-3-319-06895-4, 384 total pages.

(56) References Cited

OTHER PUBLICATIONS

Written Opinion (PCT/ISA/237) dated Jul. 3, 2017 issued by the International Searching Authority in International Application No. PCT/KR2016/011289.

Yongjoon Jeon et al. "Non-CE9: Improvement on parallelized merge/skip mode" JCT-VC 7th Meeting: Geneva, CH, Nov. 19-30, 2011, (7 pages total), JCTVC-G164, XP 030110148.

Communication issued May 21, 2025 by the National Intellectual Property Administration, PRC in Chinese Patent Application No. 202310272809.9.

Communication issued May 30, 2025 by the National Intellectual Property Administration, PRC in Chinese Patent Application No. 202310275893.X.

Communication issued May 31, 2025 by the National Intellectual Property Administration, PRC in Chinese Patent Application No. 202310272966.X.

Communication issued May 31, 2025 by the National Intellectual Property Administration, PRC in Chinese Patent Application No. 202310274829.X.

Communication issued Jul. 25, 2025 by the European Patent Office in European Patent Application No. 22212646.8.

Communication dated Jan. 7, 2026, issued by the China National Intellectual Property Administration in Chinese Application No. 202310272809.9.

Communication dated Dec. 16, 2025, issued by Intellectual Property India in Indian Application No. 202228032412.

* cited by examiner

| BLOCK SHAPE<br>DEPTH | 0: SQUARE | 1: NS_VER | 2: NS_HOR |
|---|---|---|---|
| DEPTH D | 2000 | 2010 | 2020 |
| DEPTH D+1 | 2002 | 2012 | 2022 |
| DEPTH D+2 | 2004 | 2014 | 2024 |
| ... | ... | ... | ... |

METHOD AND DEVICE FOR ENCODING OR DECODING IMAGE BY MEANS OF BLOCK MAP

CROSS-REFERENCE TO RELATED APPLICATION

This application is a continuation application of U.S. application Ser. No. 16/340,877, filed on Apr. 10, 2019, which is a National Stage Application No. PCT/KR2016/011289, filed on Oct. 10, 2016 in the Korean Intellectual Property Office, the disclosure of which are incorporated herein by reference in their entireties.

TECHNICAL FIELD

The present disclosure relates to a method and device for encoding or decoding an image, and more particularly, to a method and device for encoding or decoding an image by using a block map.

BACKGROUND ART

Image data is encoded using a codec according to a data compression standard, e.g., a Moving Picture Experts Group (MPEG) standard, and recorded on a recording medium in the form of a bitstream or transmitted via a communication channel.

With the development and supply of hardware for reproducing and storing high-resolution or high-quality image content, there is a growing need for a codec for effectively encoding or decoding the high-resolution or high-quality image content. Encoded image content may be reproduced by decoding it. Recently, methods of effectively compressing such high-resolution or high-quality image content have been implemented. For example, a method of effectively compressing an image by processing the image to be encoded in an arbitrary manner is implemented.

Various data units may be used to compress an image, and there may be an inclusion relation between such data units. In order to determine a size of a data unit to be used for image compression, the data unit may be split using various methods. An image may be encoded or decoded by determining an optimum data unit according to characteristics of the image.

DESCRIPTION OF EMBODIMENTS

Technical Problem

Provided are a method and device for encoding or decoding an image by using a block map.

Solution to Problem

According to an aspect of the present disclosure, a method of decoding an image by using a block map includes receiving a bitstream of an encoded image, determining one or more blocks in a picture by using split information obtained from the bitstream, determining a block map indicating a decoded block among the one or more blocks, determining a neighboring region which is available to be referred to for a current block to be decoded in a certain scan order among the one or more blocks, based on the block map, and decoding the current block, based on the neighboring region which is available to be referred to.

In one embodiment, in the method of decoding an image by using a block map, the block map may include regions corresponding to the one or more blocks, wherein a region of the block map corresponding to the decoded block among the one or more blocks may be set as an available region, and a region of the block map corresponding to a non-decoded block among the one or more blocks may be set as an unavailable region.

In one embodiment, in the method of decoding an image by using a block map, whenever each of the one or more blocks is decoded, the determining of the block map may include updating the block map with a value indicating each of the one or more blocks is decoded.

In one embodiment, in the method of decoding an image by using a block map, the one or more blocks may include one or more coding units or one or more transform units.

In one embodiment, in the method of decoding an image by using a block map, the block map may be created for a largest coding unit.

In one embodiment, in the method of decoding an image by using a block map, the one or more blocks may have a square shape or a non-square shape.

In one embodiment, in the method of decoding an image by using a block map, the neighboring region which is available to be referred to may include at least one of a region temporally neighboring the current block or a region spatially neighboring the current block.

In one embodiment, in the method of decoding an image by using a block map, the determining of the neighboring region which is available to be referred to may include configuring a plurality of merge candidates to derive motion information of the current block, the plurality of merge candidates including at least one of a region temporally neighboring the current block or a region spatially neighboring the current block; and when there are two or more merge candidates included in the same coding unit among the plurality of merge candidates, replacing at least one of the two or more merge candidates with a merge candidate included in a different coding unit, and the decoding of the current block may include deriving the motion information of the current block, based on the plurality of merge candidates; and predicting the current block by using the derived motion information.

In one embodiment, in the method of decoding an image by using a block map, the determining of the neighboring region which is available to be referred to may include configuring a plurality of merge candidates to derive motion information of the current block, the plurality of merge candidates including at least one of a region spatially neighboring the current block or a region temporally neighboring the current block; and when there are two or more merge candidates having the same motion information among the plurality of merge candidates, replacing at least one of the two or more merge candidates with a merge candidate having different motion information, and the decoding of the current block may include deriving the motion information of the current block, based on the plurality of merge candidates; and predicting the current block by using the derived motion information.

In one embodiment, in the method of decoding an image by using a block map, the determining of the neighboring region which is available to be referred to, may include configuring a plurality of merge candidates to derive motion information of the current block, the plurality of merge candidates including at least one of a region spatially neighboring the current block or a region temporally neighboring the current block; and when there is a first neighboring region corresponding to the unavailable region of the block map among the plurality of merge candidates, replacing the first neighboring region with a second neighboring region corresponding to the available region of the block map, and the decoding of the current block may include deriving the motion information of the current block, based on the plurality of merge candidates; and predicting the current block by using the derived motion information.

According to another aspect of the present disclosure, a method of encoding an image by using a block map includes determining one or more blocks in a picture; determining a block map representing a decoded block among the one or more blocks; determining a neighboring region which is available to be referred to for a current block to be encoded in a certain scan order among the one or more blocks, based on the block map; and encoding the current block, based on the neighboring region which is available to be referred to.

In one embodiment, in the method of encoding an image by using a block map, the block map may include regions corresponding to the one or more blocks, wherein a region of the block map corresponding to the decoded block among the one or more blocks may be set as an available region and a region of the block map corresponding to a non-decoded block among the one or more blocks may be set as an unavailable region.

In one embodiment, in the method of encoding an image by using a block map, whenever each of the one or more blocks is decoded, the determining of the block map may include updating the block map with a value indicating the decoding of each of the one or more blocks.

In one embodiment, in the method of encoding an image by using a block map, the one or more blocks may have a square shape or a non-square shape.

In one embodiment, in the method of encoding an image by using a block map, the neighboring region which is available to be referred to may include at least one of a region temporally neighboring the current block or a region spatially neighboring the current block.

According to another aspect of the present disclosure, a device for decoding an image by using a block map includes a receiver configured to receive a bitstream of an encoded image; and a decoder configured to determine one or more blocks in a picture by using split information obtained from the bitstream, determine a block map indicating a decoded block among the one or more blocks, determine a neighboring region which is available to be referred to for a current block to be decoded in a certain scan order among the one or more blocks, based on the block map, and decode the current block, based on the neighboring region which is available to be referred to.

BRIEF DESCRIPTION OF DRAWINGS

FIG. 17 illustrates that a shape into which a second coding unit is splittable is restricted when the second coding unit having a non-square shape determined when a first coding unit is split satisfies a certain condition, according to an embodiment.

FIG. 18 illustrates processes of splitting a coding unit having a square shape when split shape information is unable to indicate that a coding unit is split into four square shapes, according to an embodiment.

FIG. 20 illustrates processes of determining a depth of a coding unit as a shape and size of the coding unit are changed, when a plurality of coding units are determined when the coding unit is recursively split, according to an embodiment.

FIG. 21 illustrates a part index (PID) for distinguishing depths and coding units, which may be determined according to shapes and sizes of coding units, according to an embodiment.

MODE OF DISCLOSURE

Figure 1:
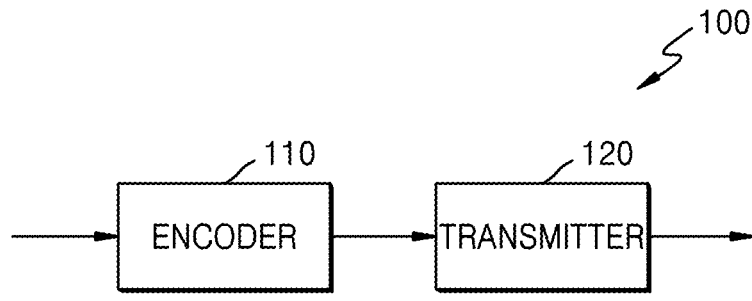
FIG. 1 is a schematic block diagram of an image encoding device 100 according to an embodiment.

Advantages and features of embodiments set forth herein and methods of achieving them will be apparent from the following description of the embodiments in conjunction with the accompanying drawings. However, the present disclosure is not limited to these embodiments and may be embodied in many different forms. The embodiments are merely provided so that this disclosure will be thorough and complete and will fully convey the scope of the present disclosure to those of ordinary skill in the art.

The terms used herein will be briefly described and then various embodiments will be described in detail.

In the present disclosure, general terms that have been widely used nowadays are selected, if possible, in consideration of functions of the present disclosure, but non-general terms may be selected according to the intentions of technicians in the art, precedents, or new technologies, etc. Some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the present disclosure.

As used herein, the singular forms "a", "an" and "the" are intended to include the plural forms as well, unless the context clearly indicates otherwise.

It will be understood that when an element is referred to as including another element, the element may further include other elements unless mentioned otherwise. The term "unit" used herein should be understood as software or a hardware component, such as a FPGA or an ASIC, which performs certain functions. However, the term "unit" is not limited to software or hardware. The term "unit" may be configured to be stored in an addressable storage medium or to reproduce one or more processors. Thus, for example, the term "unit" may include components, such as software components, object-oriented software components, class components, and task components, processes, functions, attributes, procedures, subroutines, segments of program code, drivers, firmware, microcode, a circuit, data, database, data structures, tables, arrays, and parameters. Functions provided in components and "units" may be combined to obtain a small number of components and "units" or may be divided into sub-components and "sub-units".

Hereinafter, the term "image" should be understood to include a static image, such as a still image of a video, and a moving picture, i.e., a dynamic image, which is a video.

The term "sample" should be understood as data allocated to a video sampling position, i.e., data to be processed. For example, pixel values of an image in a spatial domain and transformation coefficients in a transformation domain may be samples. A unit including such at least one sample may be defined as a block.

Embodiments will be described in detail below such that those of ordinary skill in the art may easily implement them. In the drawings, parts that are not related to clearly describing the present disclosure are omitted.

An image encoding device, an image decoding device, a method of encoding an image, and a method of decoding an image according to embodiments will be described in detail with reference to FIGS. 1 to 23 below. A method and device for encoding or decoding an image by using a block map will be described with reference to FIGS. 1 to 9 below, and methods of determining a data unit of an image will be described with reference to FIGS. 10 to 23 below.

A method and device for encoding or decoding an image by using a block map will be described with reference to FIGS. 1 to 9 below.

FIG. 1 is a schematic block diagram of an image encoding device 100 according to an embodiment. The image encoding device 100 according to an embodiment includes an encoder 110 and a transmitter 120.

In one embodiment, the encoder 110 may split image data of a current picture into largest coding units according to a largest size of a coding unit. Each of the largest coding units may include coding units split according to a block shape and a split type. In one embodiment, image data of a spatial domain included in a largest coding unit may be hierarchically classified according to a block shape and a split type. A block shape of a coding unit may be a square, a rectangle, or any geometric shape, and thus is not limited to a data unit of a certain size.

As a size of a picture to be encoded is increased, an image may be encoded at a higher image compression ratio by encoding the image in a larger unit. However, when a coding unit is increased and the size thereof is fixed, the image cannot be efficiently encoded by reflecting characteristics of the image that is continuously changing.

For example, when a flat area of the sea or the sky in an image is encoded, a compression rate may be better as a size of a coding unit is larger, but when an image of an area congested with people or a congested area of a building is encoded, a compression ratio may be better as a size of a coding unit is smaller.

To this end, the encoder 110 according to an embodiment sets a largest coding unit of a different size for each picture or slice, and sets a block shape and a split type of one or more coding units to be split from the largest coding unit. A size of the coding units included in the largest coding unit may be variably set according to the block shape and the split type.

A block shape and a split type of one or more coding units may be determined based on a calculated rate-distortion cost. The block shape and the split type may be determined differently for each picture or slice or may be determined differently for each largest coding unit. The determined block shape and split type are used for encoding image data per coding unit.

In one embodiment, a coding unit split from a largest coding unit may be characterized according to a block shape and a split type. A method of determining a coding unit according to a block shape and a split type will be described in more detail with reference to FIGS. 10 to 23 below.

In one embodiment, coding units included in a largest coding unit may be predicted or transformed (for example, by converting values of a pixel domain into values of a frequency domain), based on processing units of different sizes. In other words, the image encoding device 100 may perform a plurality of processing operations to encode an image, based on processing units of various sizes and shapes. In order to encode image data, processing operations such as prediction, transformation, and entropy encoding are performed. Processing units of the same size may be used in all operations or a processing unit of a different size may be used in each of the operations.

In one embodiment, a prediction mode of a coding unit may include at least one of an intra-mode, an inter-mode, or a skip mode, and a specific prediction mode may be performed only for a coding unit of a specific size or type. In one embodiment, a prediction mode with a minimum encoding error may be selected by performing prediction on each coding unit.

In intra-prediction, the encoder 110 may obtain a prediction sample for a current block, based on pixels of neighboring blocks in a current picture to which the current block belongs. In this case, the encoder 110 may (i) obtain a prediction sample based on an average of values of neighboring reference samples of the current block or a result of performing interpolation on the neighboring reference samples, or (ii) may obtain a prediction sample based on a reference sample located in a specific direction with respect to a pixel to be predicted among neighboring blocks of the current block. The encoder 110 may determine a prediction mode to be applied to the current block, based on a prediction mode applied to a neighboring block.

In one embodiment, the encoder 110 searches neighboring blocks adjacent to the current block for neighboring blocks reconstructed before the current block. The encoder 110 may refer to the neighboring blocks reconstructed before the current block for intra-prediction of the current block.

In inter-prediction, the encoder 110 may obtain a prediction sample for a current block, based on samples specified by a motion vector in a reference picture. The encoder 110 may apply the skip mode, a merge mode, or an MVP mode to obtain a prediction sample for the current block. In the skip mode and the merge mode, the encoder 110 may use motion information of a neighboring block as motion information of the current block. In the skip mode, a residual between the prediction sample and a reconstructed sample is not transmitted, unlike in the merge mode. In the MVP mode, difference information between a motion vector of the current block and a motion vector of a neighboring block may be encoded using the motion vector of the neighboring block as a motion vector predictor (MVP).

In inter-prediction, neighboring blocks include spatially neighboring blocks included in a current picture and temporally neighboring blocks included in a reference picture (a collocated picture). Motion information includes a motion vector and a reference picture. When motion information of a temporally neighboring block is used in the skip mode and the merge mode, a most significant picture included in a reference picture list may be used as a reference picture.

In one embodiment, the encoder 110 may search for blocks reconstructed before a current block to perform inter-prediction as described above. The blocks reconstructed before the current block may be blocks spatially neighboring to or temporally neighboring the current block. The encoder 110 may refer to the blocks reconstructed before the current block to derive motion information of the current block.

As described above, in intra-prediction and inter-prediction, blocks reconstructed before a current block are referred to. Here, the blocks may be sequentially reconstructed in a certain scan order. The scan order may be, but is not limited to, one of various orders such as a raster scan order, a Z-scan order, an N-scan order, an up-right diagonal scan order, a horizontal scan order, a vertical scan order, etc. In the above-described embodiments, the scan order is not limited to an order of reconstructing blocks, and may be for data storage, data loading, data access, or the like.

As will be described with reference to FIGS. 10 to 23 below, a block shape of a coding unit may be a square, a rectangle, or any other geometric shapes. Thus, a largest coding unit may include both square coding units and non-square coding units. In one embodiment, the encoder 110 may perform data accessing according to a certain scan index included in each of the coding units included in the largest coding unit.

In one embodiment, when a reference coding unit does not include non-square coding units, adjacent boundaries between coding units included in the reference coding unit may be continuous. In this case, data accessing may be performed on each of the coding units in a certain scan order.

In one embodiment, when a reference coding unit includes at least one non-square coding unit, boundaries between coding units included in the reference coding unit may be discontinuous. Here, an order of accessing data between coding units that are in contact with the discontinuous boundaries may be disconnected. Thus, a scan order may be adaptively controlled between the coding units that are in contact with the discontinuous boundaries. For example, data accessing may be performed in the N-scan order or the vertical scan order on a coding unit of a rectangular shape in a vertical direction, and performed in the Z-scan order or the horizontal scan order on a coding unit of a rectangular shape in a horizontal direction. The scan order will be described in detail with reference to FIG. 14 below.

As described above, one or more scan orders may be combined within a largest coding unit or a reference coding unit. Thus, an order of reconstructing blocks referred to during intra-prediction and inter-prediction may also be determined according to one or more scan orders. In one embodiment, the encoder 110 may use a block map to search for blocks decoded before a current block. In one embodiment, the encoder 110 may determine neighboring blocks to be referred to for the current block, based on the block map. In addition, the encoder 110 may update the block map with a value indicating whether or not each of the blocks is decoded whenever each of the blocks is decoded. In one embodiment, the block map include a region corresponding to one or more blocks included in a picture, in which a region of the block map corresponding to a decoded block among the one or more blocks may be set as an available area and a region of the block map corresponding to a non-decoded block among the one or more blocks may be set as an unavailable region.

In one embodiment, the encoder 110 may transform image data of a coding unit, based on not only a coding unit for encoding the image data but also a data unit different from the coding unit.

A coding unit may be transformed, based on a data unit having a size smaller than or equal to the coding unit. Examples of the data unit for the transformation may include a data unit for the intra-mode and a data unit for the inter-mode. Hereinafter, the data unit on which the transformation is based may be referred to as a transform unit.

As information for performing encoding, not only information regarding a block shape and a split type but also prediction-related information and transformation-related information are needed. Accordingly, the encoder 110 may determine a block shape and a split type that cause a minimum encoding error, a prediction mode for each coding unit, a size of a transform unit for transformation, etc.

The encoder 110 may measure an encoding error of a coding unit by using Lagrangian multiplier-based rate-distortion optimization.

The transmitter 120 outputs and transmits image data of a largest coding unit, which is encoded based on at least one coding unit determined by the encoder 110, and information regarding an encoding mode for each coding unit in a bitstream to a decoding device.

The encoded image data may be a result of encoding residual data of the image.

The information regarding the encoding mode for each coding unit may include a block shape, a split type, a prediction mode for each coding unit, size information of a transform unit, etc.

Figure 2:
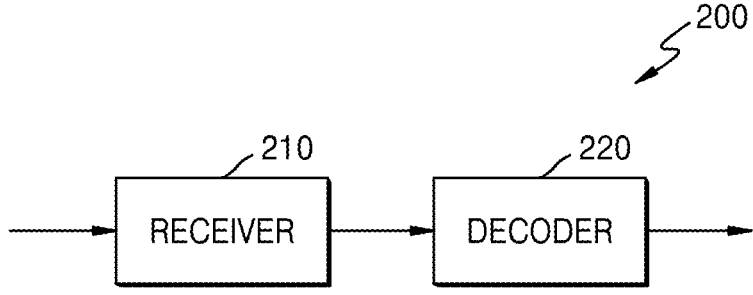
FIG. 2 is a schematic block diagram of an image decoding device 200 according to an embodiment.

FIG. 2 is a schematic block diagram of an image decoding device 200 according to an embodiment.

In one embodiment, the image decoding device 200 includes a receiver 210 and a decoder 220. In one embodiment, the definitions of various terms, such as a coding unit, block shape information, split type information, information regarding a transform unit, and information regarding a prediction mode for various processings of the image decoding device 200, are the same as those described above with respect to the image encoding device 100 of FIG. 1.

The receiver 210 receives and parses a bitstream of an encoded image. The receiver 210 extracts image data in largest coding units from the parsed bitstream, and outputs the image data to the decoder 220. The receiver 210 may extract information regarding a current picture or slice from a parameter set raw byte sequence payload (RBSP) for the current picture or slice.

Furthermore, the receiver 210 extracts block shape information and split type information regarding a coding unit split from each of the largest coding units from the parsed bitstream. The extracted block shape information and split type information are output to the decoder 220. That is, the image data of the bitstream may be split into largest coding units such that the decoder 220 may decode the image data in units of the largest coding units.

In addition, the receiver 210 may extract information regarding an encoding mode for each coding unit from the parsed bitstream. The information regarding the encoding mode may be set for one or more coding units, and may include information regarding a prediction mode for each of the coding units and size information of a transform unit.

The information regarding the encoding mode extracted by the receiver 210 is information regarding an encoding mode, in which a minimum encoding error is caused when encoding is repeatedly performed on coding units by an encoding side such as the image encoding device 100 according to an embodiment. Thus, the image decoding device 200 may reconstruct the image by decoding data by an encoding method causing a minimum encoding error.

The receiver 210 may extract information regarding an encoding mode for each smallest coding unit. When the information regarding the encoding mode for each minimum coding unit is recorded, smallest coding units having information regarding the same encoding mode may be inferred as data units included in the same largest coding unit. That is, when smallest coding units having the same information are collected and decoded, decoding may be performed based on a coding unit with a least encoding error.

The decoder 220 reconstructs a current picture by decoding image data of each coding unit, based on information regarding an encoding mode of each coding unit. A decoding process may include an inverse quantization process, an inverse quantization process, and a prediction process including intra-prediction and motion compensation.

In detail, the decoder 220 may rearrange an entropy-decoded bitstream, based on a method of rearranging it by the image encoding device 100. The decoder 220 may rearrange coefficients expressed in the form of a one-dimensional (1D) vector by reconstructing them into two-dimensional (2D) block type coefficients. The decoder 220 may rearrange the coefficients by receiving information related to scanning the coefficients by the image encoding device 100 and inversely scanning the coefficients, based on an order of scanning the coefficients by the image encoding device 100. Furthermore, the decoder 220 may perform inverse quantization, based on a quantization parameter provided from the image encoding device 100 and data of coefficients of a rearranged block. The decoder 220 may perform inverse discrete cosine transform (DCT) or inverse discrete sine transform (DST) on DCT or DST performed on a result of quantization, which was performed by the image encoding device 100, by the image encoding device 100. Inverse transformation may be performed on the basis of a transmission unit or a unit into which the image is split, which is determined by the image encoding device 100.

The decoder 220 may create prediction data of a coding unit, based on prediction-related information provided from the receiver 210 and information regarding a previously decoded block and/or picture. Reconstructed data may be created using the prediction data of the coding unit and residual data. A prediction method performed by the decoder 220 is the same as a prediction method performed by the encoder 110 of the image encoding device 100.

In detail, when a prediction mode of a current block is an intra-prediction mode, the decoder 220 may perform intra-prediction to create a prediction block based on information of pixels in a current picture. Here, the current block may be a current coding unit.

When the prediction mode of the current block is an inter-prediction mode, the decoder 220 may perform inter-prediction on the current block by using at least one of a previous picture or a subsequent picture of the current picture as a reference picture, based on information included in the reference picture. In detail, in the inter-prediction, a prediction block of the current block may be created by selecting a reference picture for the current block and selecting a reference block having the same size as the current block. For example, in the inter-prediction, the prediction block may be created such that a residual signal with respect to the current block is minimized and a magnitude of a motion vector is minimized. In this case, information of neighboring blocks of the current picture may be used to use the information of the reference picture. For example, the prediction block of the current block may be created based on the information of the neighboring blocks through the skip mode, the merge mode, the MVP mode, or the like.

The decoder 220 may use a block map to search for a block decoded before a current block and determine a neighboring block which is available to be referred to, similar to the image encoding device 100 according to an embodiment.

In one embodiment, the image decoding device 200 may obtain information regarding a coding unit causing a minimum encoding error when each of coding units is recursively encoded during an encoding process, and use this information to decode a current picture. That is, image data may be decoded on the basis of an optimum coding unit in units of coding units.

Accordingly, even an image having a high resolution or an extremely large amount of data may be reconstructed by efficiently decoding image data thereof according to a coding unit size and an encoding mode determined adaptively according to characteristics of the image, based on information regarding an optimum encoding mode transmitted from an encoding side.

Figure 3:
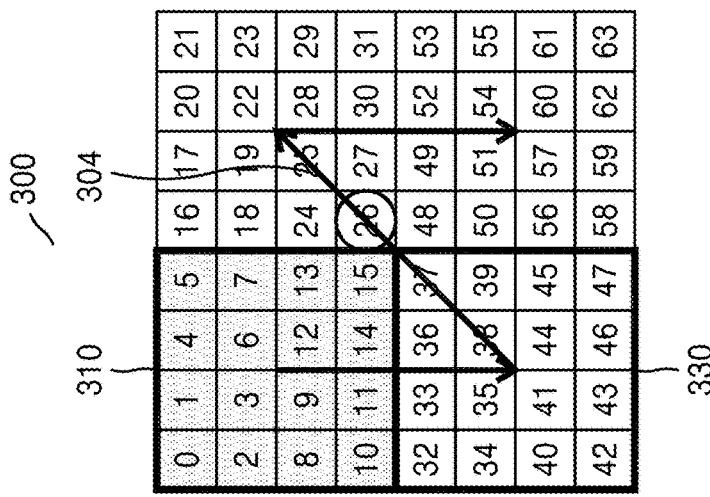
FIG. 3 is a diagram illustrating a method of determining a region which is available to be referred to, according to an embodiment.
Figure 3:
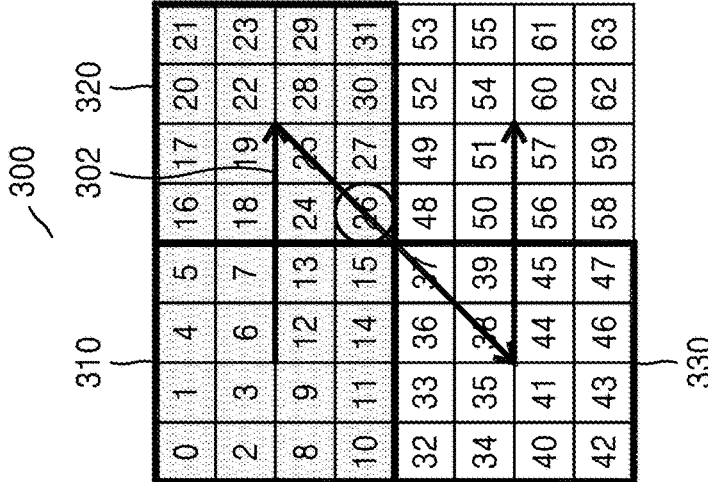

FIG. 3 is a diagram illustrating a method of determining a region which is available to be referred to, according to an embodiment.

In one embodiment, blocks 310, 320, and 330 may be scanned in a certain scan order to store, load, or access data. In one embodiment, the blocks 310, 320, and 330 may be coding units or transform units included in a largest coding unit 300. In one embodiment, the blocks 310, 320, and 330 may have a square shape or a non-square shape.

In one embodiment, the image decoding device 200 (or the image encoding device 100) may refer to neighboring blocks decoded before the current block 330 to process data of the current block 330. For example, the processing of the data may include intra-prediction, inter-prediction, or various techniques for referring to neighboring regions. For example, when a neighboring region referred to for the current block 330 is a block (region) included in the block 320 and assigned an index of 26, whether the block with the index of 26 is to be referred to for the current block 330 may be determined according to an order of scanning the blocks 310, 320, and 330. When the order of scanning the blocks 310, 320, and 330 is a Z-scan order 302, the block 320 with the index of 26 is decoded before the processing of the data of the current block 330 and thus may be referred to for the current block 330. However, when the order of scanning the blocks 310, 320, and 330 is an N-scan order 304, the block 320 with the index of 26 is decoded after the processing of the data of the current block 330 and thus cannot be referred to for the current block 330. That is, in order to refer to a neighboring block of the current block 330, whether the neighboring block is decoded before the current block 330 should be determined. However, when the blocks 310, 320, and 330 have a non-square shape, the order of scanning the blocks 310, 320, and 330 may be adaptively adjusted or changed. Accordingly, a block map may be used to exactly determine an order in which the blocks 310, 320, and 330 are decoded and search for a neighboring block decoded before the current block 330.

Figures 4, 5:
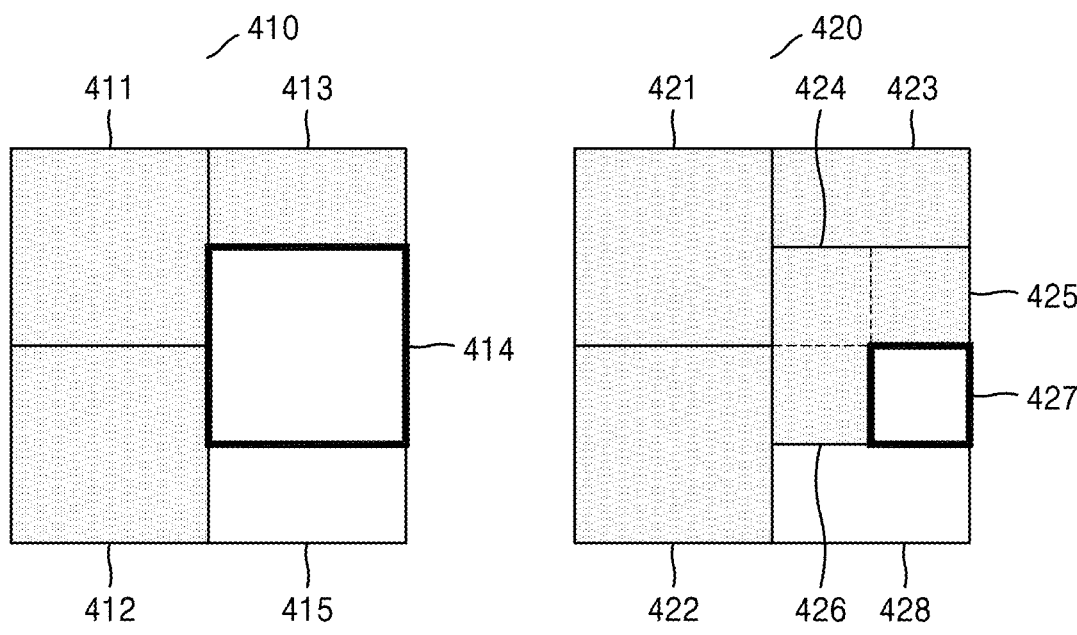
FIG. 4 is a diagram illustrating a block map according to an embodiment.
FIG. 5 is a diagram illustrating a method of configuring a plurality of merge candidates to derive motion information of a current block, according to an embodiment.

FIG. 4 is a diagram illustrating a block map according to an embodiment.

In one embodiment, the block maps 410 and 420 may be set for a current largest coding unit. A largest coding unit decoded before the current largest coding unit may be available as a reference for the current largest coding unit and thus a block map thereof need not be stored any longer.

In one embodiment, the block maps 410 and 420 may include a region corresponding to one or more blocks. In one embodiment, the block map 410 may include regions 411, 412, 413, 414, and 415 corresponding to one or more coding units included in a largest coding unit. In one embodiment, the block map 420 may include regions 421, 422, 423, 424, 425, 426, 427, and 428 corresponding to one or more transform units included in a largest coding unit.

In one embodiment, in the block map 410, the regions 411, 412, and 413 corresponding to decoded coding units among the one or more coding units may be set to available regions, and the region 415 corresponding to a non-decoded coding unit among the one or more coding units may be set to an unavailable region.

In one embodiment, the block map 410 may be updated when each of the coding units is decoded. For example, whenever the coding units are decoded in a certain scan order, the regions 411, 412, and 413 of the block map 410 corresponding to the decoded coding units may be sequentially updated with an available-region value (e.g., a value 'TRUE') and the remaining region 415 may be kept having an unavailable-region value (e.g., a value 'FALSE'). The available regions 411, 412, and 413 of the block map 410 may be used as references for the current coding unit 414.

In one embodiment, in the block map 420, the regions 421, 422, 423, 424, 425, and 426 corresponding to decoded transform units of one or more transform units may be set to available regions and the region 428 corresponding to a non-transform unit among one or more transform units may be set to an unavailable region.

In one embodiment, the block map 420 may be updated when each of the transform units are decoded. For example, whenever the transform units are decoded in a certain scan order, the regions 421, 422, 423, 424, 425, and 426 of the block map 420 corresponding to the decoded transform units may be sequentially updated with the available-region value (e.g., the value 'TRUE') and the remaining region 428 may be kept having the unavailable-region value (e.g., the value 'FALSE'). The available regions 421, 422, 423, 424, 425, and 426 of the block map 420 may be used as references for the current transform unit 427.

In one embodiment, whether the value of each of the regions of the block maps 410 and 420 is the available-region value or the unavailable-region value may be determined to determine whether the regions are to be referred to for the current coding unit 414 or the current transform unit 427.

In one embodiment, in the block maps 410 and 420, not only a region spatially neighboring to a current block but also a region temporally neighboring the current block may be determined to be regions which are available to be referred to.

In one embodiment, regions of the block maps 410 and 420 corresponding to one or more blocks may have a square or non-square shape, similar to shapes of coding units as described above.

In one embodiment, the block maps 410 and 420 may be created for each largest coding unit, and a previously created block map may be updated whenever each coding unit or each transform unit included in a largest coding unit is decoded.

In one embodiment, the block maps 410 and 420 may be created with respect to largest coding units and thus the availability of regions beyond a current largest coding unit may be determined by determining an order of processing largest coding units. That is, a region belonging to a largest coding unit decoded before the current largest coding unit may be determined to be an available region and a region belonging to a non-decoded largest coding unit may be determined to be an unavailable region.

Various embodiments in which the availability of neighboring blocks to be referred to as for a current block is determined or the neighboring blocks are adaptively changed based on the block maps 410 and 420 will be described below.

In one embodiment, the image decoding device 200 (or the image encoding device 100) may perform intra-prediction to predict a current block by using neighboring blocks of a picture adjacent to the current block. In one embodiment, a current block may be predicted by adding a weight value to one or more pixel values of one or more neighboring blocks to calculate a predicted pixel value of each pixel of the current block.

Here, the neighboring blocks are blocks reconstructed before the current block, and the availability thereof may be determined using a block map as described above. In one embodiment, neighboring blocks used for intra-prediction may be one or more neighboring blocks around the current block, and may include, for example, at least one of blocks located at a left side and an upper side of the current block.

In one embodiment, the image decoding device 200 (or the image encoding device 100) may derive motion information of the current block and performs inter-prediction on the current block based on the derived motion information.

An image used for prediction of a current block is referred to as a reference picture or a reference frame. A region of the reference picture may be represented using a reference picture index refIdx, a motion vector, or the like indicating the reference picture.

For a current picture, a reference picture list may be composed of pictures used for prediction and a reference picture index may indicate a specific reference picture included in the reference picture list. For a P-picture, one reference picture list, e.g., a reference picture list 0, is needed. For a B-picture, two reference picture lists, e.g., a reference picture list 0 and a reference picture list 1, are needed.

In detail, an I-picture is a picture which may be encoded/decoded through intra-prediction. The P-picture is a picture which may be encoded/decoded through inter-prediction or intra-prediction using at least one motion vector and at least one reference picture index to predict a sample value of each block. The B-picture is a picture which may be encoded/decoded through inter-prediction or intra-prediction using at least two motion vector and at least two reference picture indexes to predict a sample value of each block.

For the P-picture, one reference picture list is needed and is referred to as a reference picture list 0 (hereinafter referred to as L0).

The B-picture is a picture that may be encoded through forward inter-prediction, backward inter-prediction, or bidirectional inter-prediction using one or more reference pictures, e.g., two reference pictures. For the B-picture, two reference picture lists are needed and are referred to as a reference picture list 0 (hereinafter referred to as L0) and a reference picture list 1 (hereinafter referred to as L1).

Inter-prediction using a reference picture selected from L0 will be referred to as L0 prediction, and inter-prediction using a reference picture selected from L1 will be referred to as L1 prediction. The L0 prediction may be used for forward prediction and the L1 prediction may be used for backward prediction but directions of the L0 prediction and the L1 prediction are not limited to those in the above embodiment. Inter-prediction using two reference pictures respectively selected from L0 and L1 is referred to a bi-prediction.

Features of the I-picture, the P-picture, and the B-picture may be defined in units of slices rather than pictures. For example, an I-slice having features of an I-picture, a P-slice having features of a P-picture, and a B-slice having features of a B-picture which are slice units may be defined.

For example, when a slice type of a current block is B and colPic is selected from L0 or when the slice type of the current block is P, colPic may be selected from L0.

To prevent low delay, both directions of prediction of the reference picture lists 0 and 1 may be limited to a forward direction.

For inter-prediction, information regarding neighboring blocks may be directly used for a current block in the skip mode. Thus, in the skip mode, syntax information, such as a residual, except information indicating a block of which motion information is to be used as motion information of the current block is not transmitted.

In the merge mode, a prediction block of a current block may be created by directly using motion information of a neighboring block. The image encoding device 100 may transmit information indicating whether the merge mode is to be applied, information regarding a block of which motion information is to be used, residual information, etc. to the image decoding device 200. The image decoding device 200 may reconstruct the current block by adding the prediction block and a residual transmitted from the image encoding device 100.

A method of indicating a block of which information is to be used in the merge mode, etc. are applicable to the skip mode and a general inter-prediction mode. For example, in the merge mode and another inter-prediction modes, a candidate block having information to be used as motion information of the current block may be commonly used and the same method may be used to indicate a neighboring block of which motion information is to be used.

In this case, in the skip mode and the general inter-prediction mode, it may be determined that there is available motion information only when a reference picture index or a prediction direction (a reference picture list) of a neighboring block match a reference picture index or a prediction direction (a reference picture list) of a current block, and thus, a motion vector of the neighboring block may be used as a motion vector predictor candidate of the current block.

FIG. 5 is a diagram illustrating a method of configuring a plurality of merge candidates to derive motion information of a current block, according to an embodiment.

Referring to FIG. 5, merge candidates of a current block 500 may include a first lower left block 502 with an index of 45, a second upper right block 504 with an index of 66, a third lower left block 506 with an index of 39, a fourth upper right block 508 with an index of 23, and a fifth upper left block 510 with an index of 7. In addition, there may be a sixth temporal candidate prediction block (not shown).

The number of merge candidates may be fixed. For example, the number of merge candidates may be fixed to five. Among the merge candidates, the number of spatial candidate prediction blocks may be limited to a certain value. For example, in case that merge candidates may include four spatial candidate prediction blocks, when there is an unavailable block among the first lower left block 502 with the index of 45, the second upper right block 504 with the index of 66, the third lower left block 506 with the index of 39, and the fourth upper right block 508 with the index of 23, the fifth upper left block 510 with the index of 7 may be substituted for the unavailable block in a merge candidate list according to an order of priority.

In case that a motion vector predictor (MVP) is used, a motion vector of a first available block may be used as a candidate prediction motion vector when block availability is determined in an order from the first lower left block 502 with the index of 45 to the third lower left block 506 with the index of 39. Next, a motion vector of a first available block may be selected as a candidate prediction motion vector and a motion vector of a last temporal candidate prediction block may be used as a candidate prediction motion vector, when block availability is determined in an order of the second upper right block 504 with the index of 66, the fourth upper right block 508 with the index of 23, and the fifth upper left block 510 with the index of 7.

In one embodiment, the image decoding device 200 (or the image encoding device 100) may determine whether blocks which are merge candidates are available, based on a block map.

In one embodiment, motion information of a current block may be derived based on the merge candidates, and the current block may be predicted using the derived motion information. In one embodiment, the motion information may include information regarding a motion vector, a prediction direction, an index of a reference picture, etc.

Figure 6:
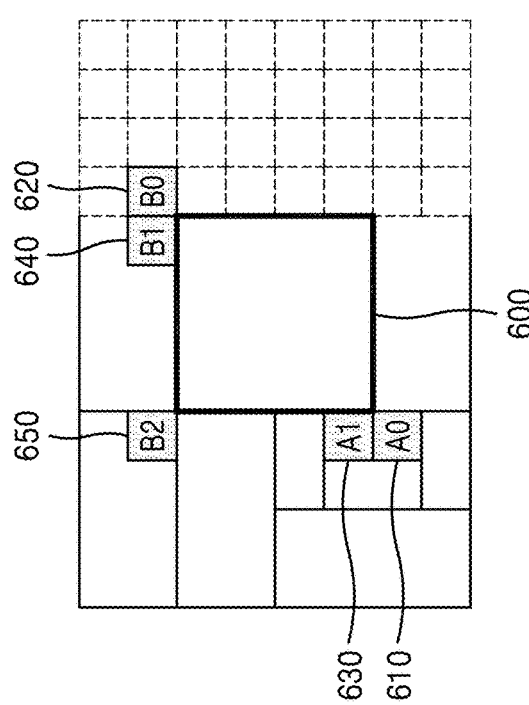
FIG. 6 illustrates methods of changing merge candidates having the same motion information, according to various embodiments.
Figure 6:
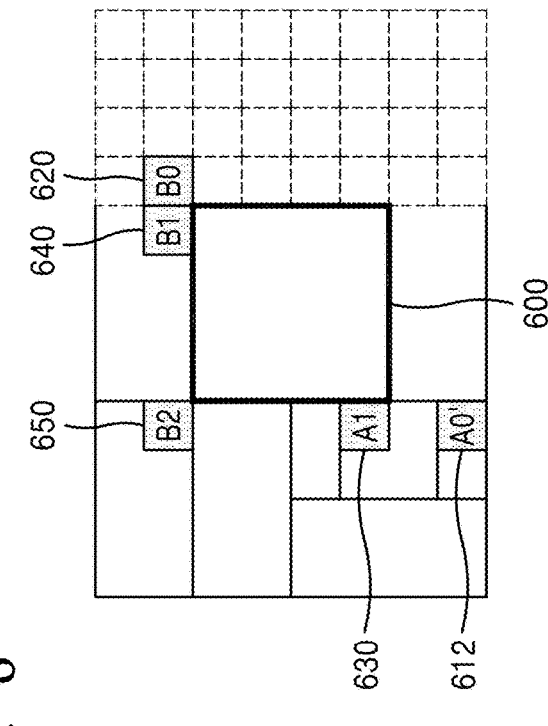
Figure 6:
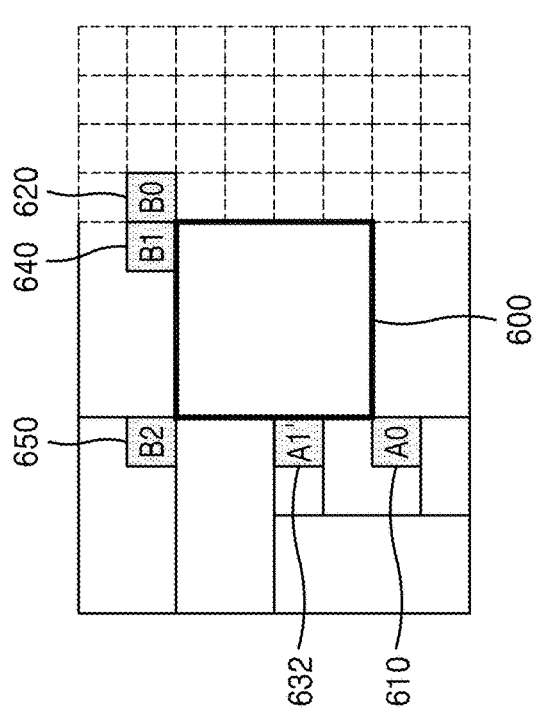
Figure 6:
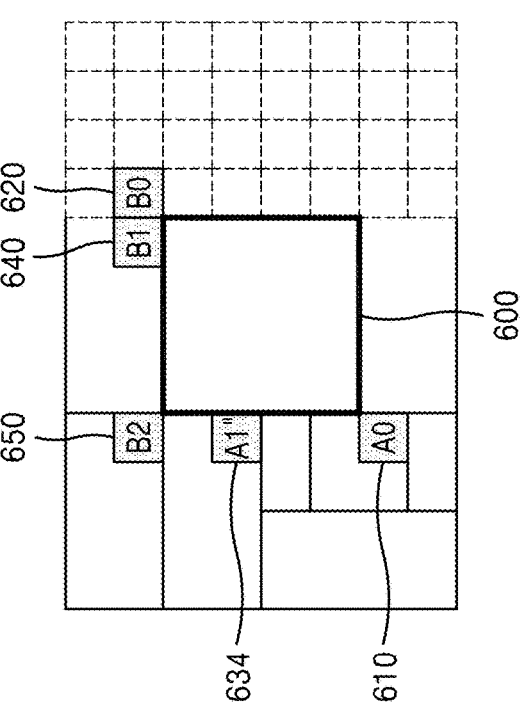

FIG. 6 illustrates methods of changing merge candidates having the same motion information, according to various embodiments.

Referring to FIG. 6, merge candidates of a current block 600 may include a first lower left block A0 610, a second upper right block B0 620, a third lower left block A1 630, a fourth upper right block B1 640, and a fifth upper left block B2 650. In addition, there may be a sixth temporal candidate prediction block (not shown).

In one embodiment, there may be a case in which two or more merge candidates among the spatial merge candidates 610, 620, 630, 640, and 650 of the current block 600 are included in the same coding unit. In this case, the two or more merge candidates belonging to the same coding unit may have the same motion vector. Thus, at least one merge candidate of the two or more merge candidates belonging to the same coding unit may be replaced with a new merge candidate. To replace a merge candidate, an available merge candidate may be searched for by using a block map. Thus, in one embodiment, the block map may be used to select a neighboring region which is a target to be referred to for the current block 600. In one embodiment, the lower left block A0 610 and the lower left block A1 630 among the spatial merge candidates 610, 620, 630, 640, and 650 of the current block 600 may be included in the same coding unit. In this case, the lower left block A0 610 and the lower left block A1 630 belonging to the same coding unit have the same motion vector and at least one thereof may be replaced with a merge candidate having different motion information and located at a different position.

In one embodiment, when the lower left block A0 610 and the lower left block A1 630 are included in the same coding unit and have the same motion vector, the lower left block A0 610 among the merge candidates may be replaced with a block A0' 612 adjacent to the lower left block A0 610. In one embodiment, when the lower left block A0 610 and the lower left block A1 630 are included in the same coding unit and have the same motion vector, the lower left block A1 630 among the merge candidates may be replaced with a block A1" 632 adjacent to the lower left block A1 630. That is, at least one of the lower left block A0 610 and the lower left block A1 630 belonging to the same coding unit and having the same motion vector may be replaced with a block (e.g., the block A0' block 612 or the block A1" block 632) included in another coding unit adjacent to the coding unit to which the lower left block A0 610 and the lower left block A1 630 belong.

However, even when at least one of the lower left block A0 610 or the lower left block A1 630 is replaced with a block (e.g., the block A0' block 612 or the block A1" block 632) included in a coding unit different from the coding unit to which the lower left block A0 610 and the lower left block A1 630 belong, a motion vector of the block may be the same as that of the lower left block A0 610 or the lower left block A1 630. In this case, at least one of the lower left block A0 610 or the lower left block A1 630 may be replaced with a block (e.g., a block A1" 634) located most adjacent to the coding unit to which the lower left block A0 610 and the lower left block A1 630 belong and having a different motion vector.

In the above-described embodiment, the block A0' 612, A1' block 632, or A1" 634 replacing the merge candidate may be a block that is set as an available region in the block map. That is, these merge candidates may be blocks decoded before prediction of the current block 600.

In another embodiment, two or more merge candidates not included in the same coding unit among the spatial merge candidates 610, 620, 630, 640, and 650 and the temporal merge candidate of the current block 600 may have the same motion vector. In this case, at least one merge candidate among two or more merge candidates not included in the same coding unit and having the same motion vector may be replaced with a new merge candidate. To replace a merge candidate, an available merge candidate may be searched for by using a block map. Accordingly, in one embodiment, the block map may be used to select a neighboring region which is a target to be referred to for the current block 600.

In one embodiment, among the merge candidates, the lower left block A0 610 and the lower left block A1' 632 belong to different coding units but may have the same motion vector. In this case, at least one of the block A0 610 and the block A1' 632 may be replaced with a block (e.g., the block A1" 634) having a different motion vector from those of the block A0 610 and the block A1' block 632. In one embodiment, the block having the different motion vector may be selected from among blocks of a coding unit adjacent to the block A0 610 or the block A1' 632. An embodiment for replacement of a merge candidate is not limited to the above-described embodiment, and a neighboring region of the current block 600 among blocks that are set as available regions of a block map may be changed to a merge candidate. For example, a merge candidate to which a merge candidate of the current block 600 is changed may be selected from among neighboring blocks adjacent to the current block 600, selected from among blocks included in a coding unit different from the merge candidate of the current block 600, or selected from among blocks adjacent to the current block 600 and most similar to the merge candidate of the current block 600.

According to the above-described embodiment, the image decoding device 200 (or the image encoding device 100) may derive motion information of the current block 600, based on the merge candidate to which the merge candidate of the current block 600 is changed, and predict the current block 600 by using the derived motion information.

Figure 7:
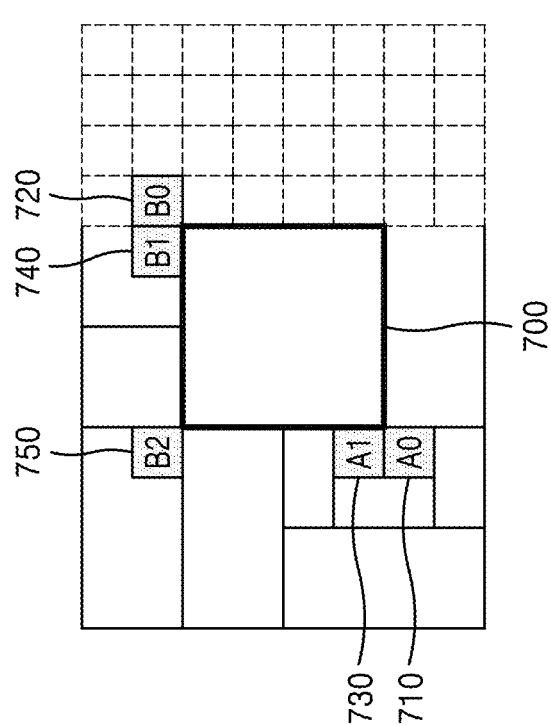
FIG. 7 illustrates methods of changing a merge candidate of a region that is not available to be referred to, according to various embodiments.

FIG. 7 illustrates methods of changing a merge candidate of a region that is not available to be referred to, according to various embodiments.

Referring to FIG. 7, merge candidates of a current block 700 may include a first lower left block A0 710, a second upper right block B0 720, a third lower left block A1 730, a fourth upper right block B1 740, and fifth upper left block B2 750. In addition, there may be a sixth temporal candidate prediction block (not shown).

In one embodiment, when there is a merge candidate corresponding to an unavailable region of a block map among the spatial merge candidates 710, 720, 730, 740, and 750 and the temporal merge candidate of the current block 700, the merge candidate corresponding to the unavailable region of the block map may be replaced with a merge candidate corresponding to an available region of the block map.

For example, among the spatial merge candidates 710, 720, 730, 740, and 750 of the current block 700, the block A0 710, the block A1 730, the block B1 740 and the block B2 750 may correspond to available regions of the block map and the block B0 720 may correspond to the unavailable region of the block map. In this case, the block B0 720 cannot be referred to for the current block 700 and thus may be changed to a block B0' 722 corresponding to an available region of the block map among the merge candidates.

For example, when the block B0' 722 which is a merge candidate is included in the same coding unit as the block B1 740 which is another merge candidate, the block B1 740 which is another merge candidate corresponding to an available region of the block map may be changed to a block B1' 742 neighboring thereto to prevent overlapping of merge candidates. In this case, similarly, the block B1' 742 may be selected from among blocks corresponding to available regions of the block map.

According to the above-described embodiment, the image decoding device 200 (or the image encoding device 100) may predict motion information of the current block 700, based on a merge candidate to which the merge candidate of the current block 700 is changed, and reconstruct the motion information of the current block 700 by using the predicted motion information.

When the MVP mode is applied, motion information of a current block with respect to a reference picture may be obtained, based on the sum of a motion vector difference (MVD) between the current block and a neighboring block with respect to the reference picture and a motion vector predictor (MVP) of the neighboring block with respect to the reference picture.

In detail, the image encoding device 100 may predict a motion vector of the current block by using motion information of neighboring blocks, and transmit the difference between the motion vector of the current block and the predicted motion vector, together with a reference picture index indicating the reference picture. The image decoding device 200 may predict the motion vector of the current block by using the motion information of the neighboring blocks, and derive the motion vector of the current block by using a residual received from the image encoding device 100. The image decoding device 200 may create a prediction block of the current block, based on the derived motion vector and reference picture index information received from the image encoding device 100.

In one embodiment, when the MVP mode is applied to inter-prediction, a method of creating a motion vector predictor (MVP) candidate list of the current block may be the same as the method of creating a merge candidate list as described above with reference to FIGS. 5 to 7.

In one embodiment, the image encoding device 100 or the image decoding device 200 may create a MVP candidate list of the current block. The MVP may represent a prediction value of the motion vector of the current block. In this case, the MVP candidate list may be created using an available neighboring block adjacent to the current block and/or a motion vector of an available block among blocks of reference pictures which are co-located with the current block.

That is, the availability of the blocks constituting the MVP candidate list may be determined based on the block map. A co-located block of a picture reconstructed before a current picture may be determined to be a region available without using the block map.

The image encoding device 100 may select an optimum MVP for the current block by applying motion vector competition (MVC) to MVP candidates included in the MVP candidate list. The image encoding device 100 may transmit an index of the selected MVP, the motion vector difference (MVD), and the reference picture index in a bitstream to the image decoding device 200. The MVP index is an index indicating an MVP of the current block and may indicate one of the MVP candidates included in the MVP candidate list. The reference picture index is an index indicating a reference picture of the current block and may indicate one of reference picture candidates included in a reference picture list. The MVD is the difference between the motion vector of the current block and the selected MVP. As the MVD becomes smaller, the amount of information to be transmitted may be reduced.

The image decoding device 200 may receive the MVP index and the reference picture index from the image encoding device 100. By using the received MVP index, the image decoding device 200 may select an MVP for the current block from among the MVP candidates included in the MVP candidate list. By using the received reference picture index, the image decoding device 200 may select a reference picture for the current block from among the reference picture candidates included in the reference picture list.

The image decoding device 200 may derive the motion vector of the current block by using the selected MVP and the reference picture, together with the received MVD. For example, the image decoding device 200 may reconstruct the motion vector of the current block by adding the received MVD to the MVP.

As described above, a block map may be used to determine whether a neighboring block is a region to be referred to for configuration of a merge candidate or an MVP candidate. A position of a neighboring block to be referred to may be adaptively changed, based on whether the neighboring block is available.

A block map may be used to create a merge candidate or an MVP candidate list, and is also applicable to various techniques for referring to neighboring region in an encoding process and a decoding process. For example, in intra-prediction, the block map may be used to determine whether a neighboring block included in a picture and adjacent to a current block is available to be referred to as described above.

Figure 8:
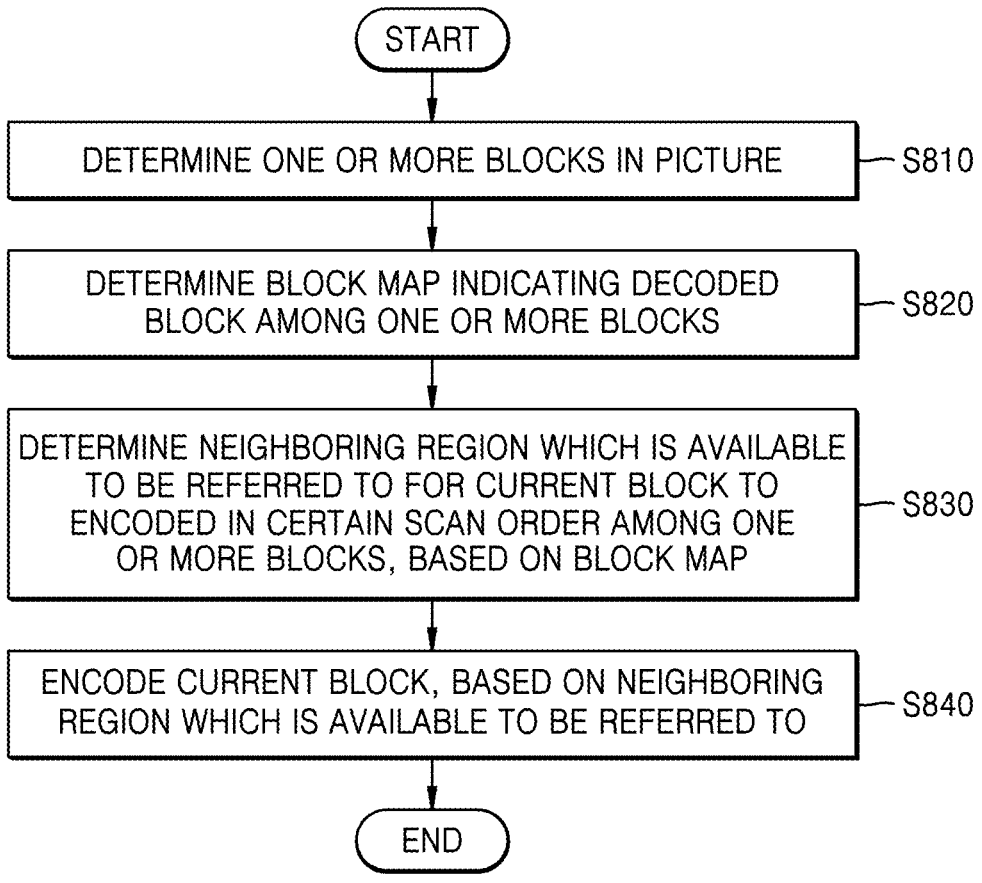
FIG. 8 is a flowchart of a method of encoding an image, according to an embodiment.

FIG. 8 is a flowchart of a method of encoding an image, according to an embodiment.

In operation S810, one or more blocks included in a picture are determined. The one or more blocks may be configured as one or more coding units or one or more transform units. The one or more blocks may have a square shape or a non-square shape.

In operation S820, a block map indicating a decoded block among the one or more blocks is determined. The block map may be updated whenever each of the blocks is decoded. The block map may be created for each largest coding unit. The block map may include regions corresponding to the one or more blocks, in which a region corresponding to the decoded block may be set as an available region and a region corresponding to a non-decoded block may be set as an unavailable region.

In operation S830, a neighboring region which is available to be referred to for a current block to be encoded in a certain scan order among the one or more blocks is determined, based on the block map. The scan order may be one of various scan orders such as the raster scan order, the Z-scan order, the N-scan order, the up-right diagonal scan order, the horizontal scan order, the vertical scan order, etc., but is not limited thereto.

In operation S840, the current block is decoded, based on the neighboring region which is available to be referred to. Encoded image data of at least one coding unit of each largest coding unit may be transmitted to a decoding side. Information regarding a block shape and split type for splitting each coding unit, information regarding a prediction mode of each coding unit, information regarding a size, shape, and split type of each transform unit may be transmitted to the decoding side, together with the encoded image data.

Figure 9:
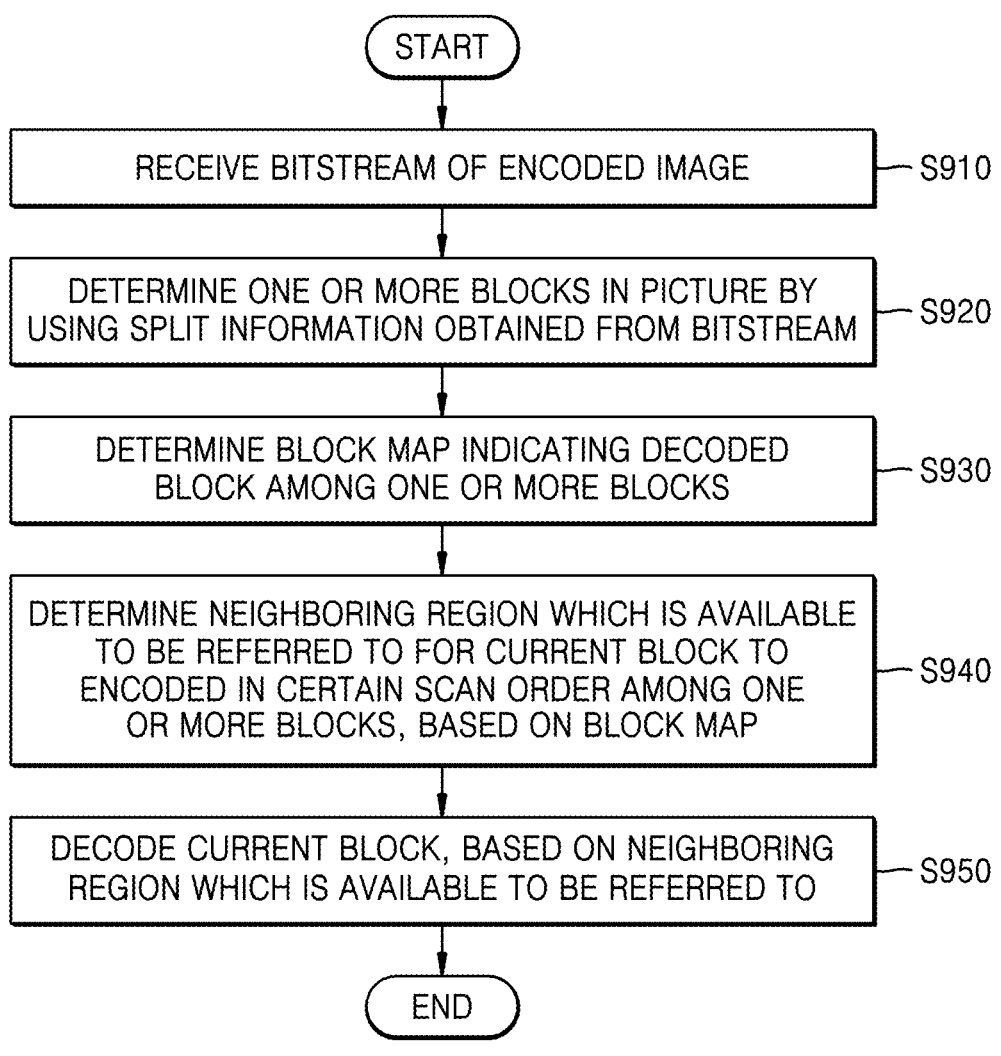
FIG. 9 is a flowchart of a method of decoding an image, according to an embodiment.

FIG. 9 is a flowchart of a method of decoding an image, according to an embodiment.

In operation S910, a bitstream of an encoded image is received. The bitstream may include information regarding a block shape and block split type for splitting each coding unit, information regarding a prediction mode of each coding unit, and information regarding a size, shape, and split type of each transform unit, as well as encoded image data.

In operation S920, one or more blocks included in a picture are determined using split information obtained from the bitstream. The split information may include the information regarding the block shape and split type for splitting each coding unit. The one or more blocks may have a square shape or a non-square shape.

In operation S930, a block map indicating a decoded block among the one or more blocks is determined. The block map may be updated whenever each of the blocks is decoded. The block map may be created for each largest coding unit. The block map may include regions corresponding to the one or more blocks, in which a region corresponding to the decoded block may be set as an available region and a region corresponding to a non-decoded block may be set as an unavailable region.

In operation S940, a neighboring region which is available to be referred to for a current block to be decoded in a certain scan order among the one or more blocks is determined, based on the block map. The scan order may be one of various scan orders such as the raster scan order, the Z-scan order, the N-scan order, the up-right diagonal scan order, the horizontal scan order, the vertical scan order, etc., but is not limited thereto.

In operation S950, the current block is decoded, based on the neighboring region which is available to be referred to.

Hereinafter, a method of determining a data unit of an image according to an embodiment will now be described with reference to FIGS. 10 through 23.

Figure 10:
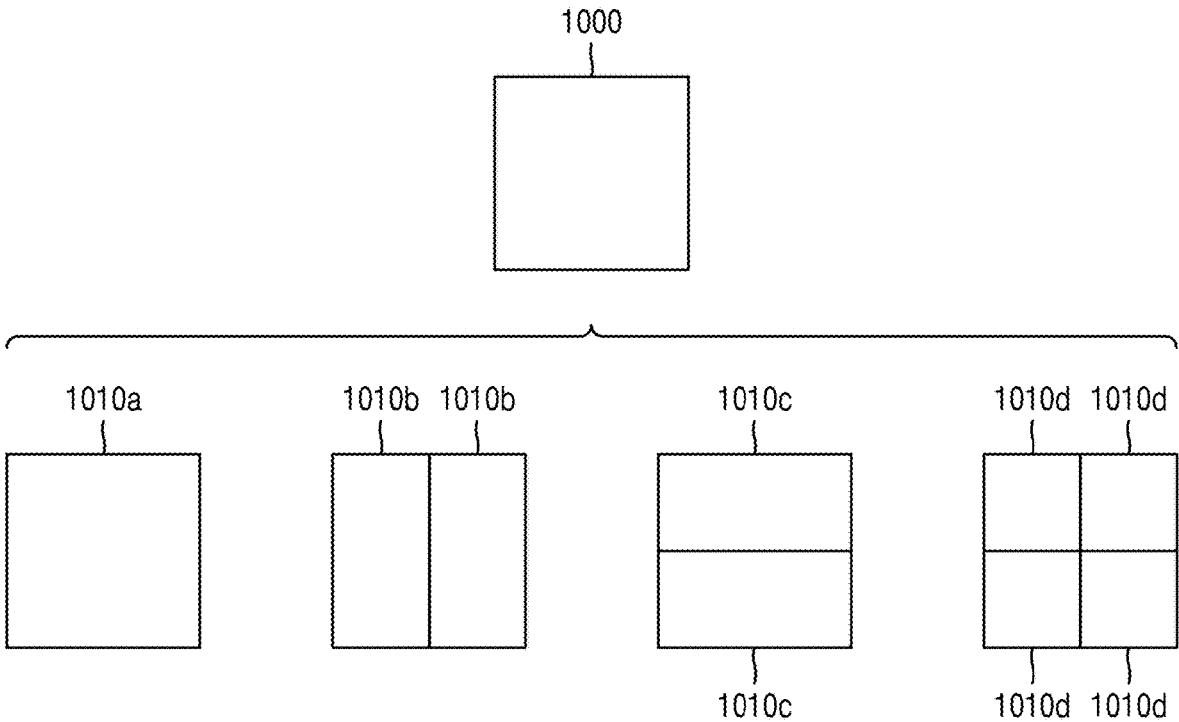
FIG. 10 illustrates processes of determining at least one coding unit as a current coding unit is split, according to an embodiment.

FIG. 10 illustrates processes of determining at least one coding unit as the image decoding device 200 splits a current coding unit, according to an embodiment.

According to an embodiment, the image decoding device 200 may determine a shape of a coding unit by using block shape information, and determine into which shape a coding unit is split by using split shape information. That is, a coding unit splitting method that is indicated by the split shape information may be determined based on a block shape indicated by the block shape information used by the image decoding device 200.

According to an embodiment, the image decoding device 200 may use block shape information indicating that a current coding unit has a square shape. For example, the image decoding device 200 may determine, according to split shape information, whether to not split a square coding unit, to split the square coding unit vertically, to split the square coding unit horizontally, or to split the square coding unit into four coding units. Referring to FIG. 10, when block shape information of a current coding unit 1000 indicates a square shape, the decoder 220 may not split a coding unit 1010a having the same size as the current coding unit 1000 according to split shape information indicating non-split, or determine coding units 1010b, 1010c, or 1010d based on split shape information indicating a certain splitting method.

Referring to FIG. 10, the image decoding device 200 may determine two coding units 1010b by splitting the current coding unit 1000 in a vertical direction based on split shape information indicating splitting in a vertical direction, according to an embodiment. The image decoding device 200 may determine two coding units 1010c by splitting the current coding unit 1000 in a horizontal direction based on split shape information indicating splitting in a horizontal direction. The image decoding device 200 may determine four coding units 1010d by splitting the current coding unit 1000 in vertical and horizontal directions based on split shape information indicating splitting vertical and horizontal directions. However, a split shape into which a square coding unit may be split is not limited to the above shapes, and may include any shape indicatable by split shape information. Certain split shapes into which a square coding unit are split will now be described in detail through various embodiments.

Figure 11:
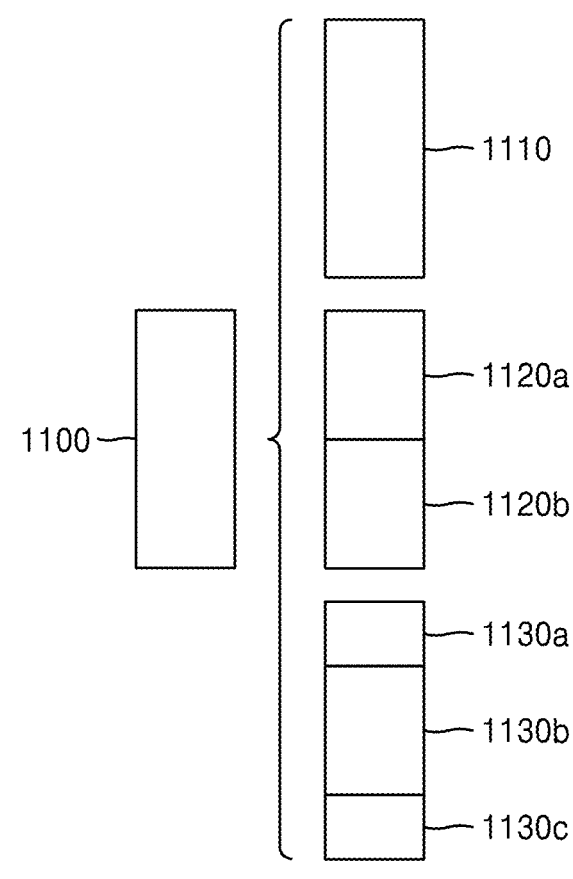
FIG. 11 illustrates processes of determining at least one coding unit when a coding unit having a non-square shape is split, according to an embodiment.
Figure 11:
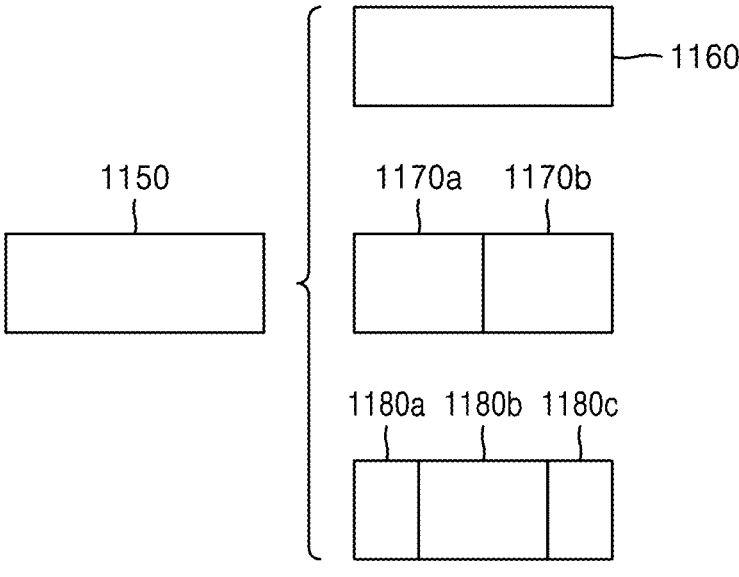

FIG. 11 illustrates processes of determining at least one coding unit as the image decoding device 200 splits a coding unit having a non-square shape, according to an embodiment.

According to an embodiment, the image decoding device 200 may use block shape information indicating that a current coding unit has a non-square shape. The image decoding device 200 may determine, according to split shape information, whether to not split the non-square current coding unit or to split the non-square current coding unit via a certain method. Referring to FIG. 11, when block shape information of a current coding unit 1100 or 1150 indicates a non-square shape, the image decoding device 200 may not split coding units 1110 or 1160 having the same size as the current coding unit 1100 or 1150 according to split shape information indicating non-split, or determine coding units 1120a, 1120b, 1130a, 1130b, 1130c, 1170a, 1170b, 1180a, 1180b, and 1180c based on split shape information indicating a certain splitting method. A certain splitting method of splitting a non-square coding unit will now be described in detail through various embodiments.

According to an embodiment, the image decoding device 200 may determine a shape into which a coding unit is split by using split shape information, and in this case, the split shape information may indicate the number of at least one coding units generated as the coding unit is split. Referring to FIG. 11, when split shape information indicates that the current coding unit 1100 or 1150 is split into two coding units, the image decoding device 200 may determine two coding units 1120a and 1120b or 1170a and 1170b included in the current coding unit 1100 or 1150 by splitting the current coding unit 1100 or 1150 based on the split shape information.

According to an embodiment, when the image decoding device 200 splits the current coding unit 1100 or 1150 having a non-square shape based on split shape information, the image decoding device 200 may split the current coding unit 1100 or 1150 while considering locations of long sides of the current coding unit 1100 or 1150 having a non-square shape. For example, the image decoding device 200 may determine a plurality of coding units by splitting the current coding unit 1100 or 1150 in a direction of splitting the long sides of the current coding unit 1100 or 1150 considering a shape of the current coding unit 1100 or 1150.

According to an embodiment, when split shape information indicates that a coding unit is split into an odd number of blocks, the image decoding device 200 may determine the odd number of coding units included in the current coding unit 1100 or 1150. For example, when split shape information indicates that the current coding unit 1100 or 1150 is split into three coding units, the image decoding device 200 may split the current coding unit 1100 or 1150 into three coding units 1130a, 1130b, and 1130c or 1180a, 1180b, and 1180c. According to an embodiment, the image decoding device 200 may determine the odd number of coding units included in the current coding unit 1100 or 1150, and the sizes of the determined coding units may not be the all same. For example, the size of coding unit 1130b or 1180b from among the determined odd number of coding units 1130a, 1130b, and 1130c or 1180a, 1180b, and 1180c may be different from the sizes of coding units 1130a and 1130c or 1180a and 1180c. That is, coding units that may be determined as the current coding unit 1100 or 1150 is split may have a plurality of types of sizes, and in some cases, the coding units 1130a, 1130b, and 1130c or 1180a, 1180b, and 1180c may have different sizes.

According to an embodiment, when split shape information indicates that a coding unit is split into an odd number of blocks, the image decoding device 200 may determine the odd number of coding units included in the current coding unit 1100 or 1150, and in addition, may set a certain limit on at least one coding unit from among the odd number of coding units generated via splitting. Referring to FIG. 11, the image decoding device 200 may differentiate decoding processes performed on the coding unit 1130b or 1180b located at the center from among the three coding units 1130a, 1130b, and 1130c or 1180a, 1180b, and 1180c generated as the current coding unit 1100 or 1150 is split from the other coding units 1130a and 1130c or 1180a and 1180c. For example, the image decoding device 200 may limit the coding unit 1130b or 1180b located at the center to be no longer split unlike the other coding units 1130a and 1130c or 1180a and 1180c, or to be split only a certain number of times.

Figure 12:
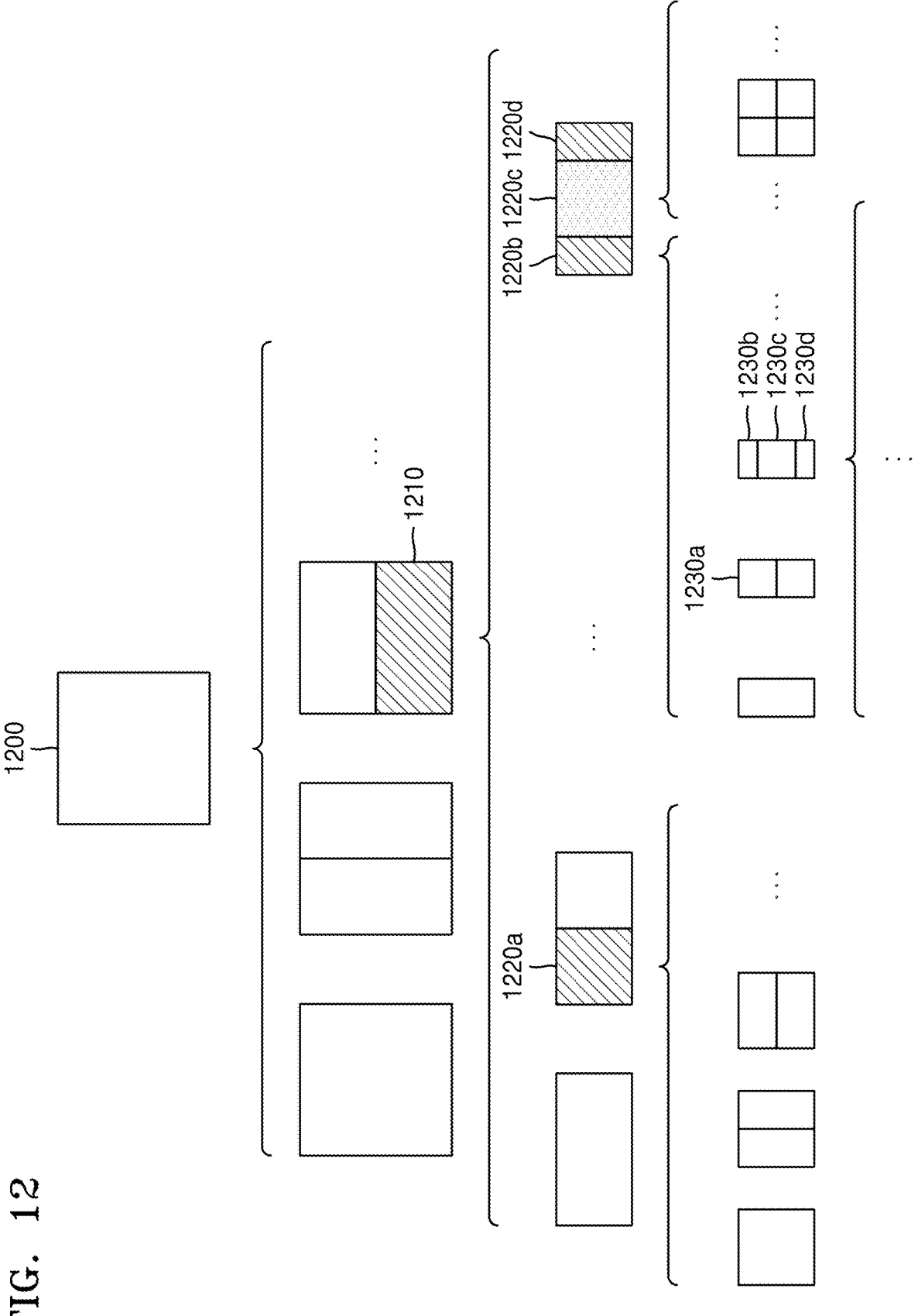
FIG. 12 illustrates processes of splitting a coding unit, based on at least one of block shape information and split shape information, according to an embodiment.

FIG. 12 illustrates processes in which the image decoding device 200 splits a coding unit, based on at least one of a block shape information and split shape information, according to an embodiment.

According to an embodiment, the image decoding device 200 may determine a first coding unit 1200 having a square shape to be split or not to be split into coding units, based on at least one of block shape information and split shape information. According to an embodiment, when the split shape information indicates that the first coding unit 1200 is split in a horizontal direction, the image decoding device 200 may determine a second coding unit 1210 by splitting the first coding unit 1200 in the horizontal direction. A first coding unit, a second coding unit, and a third coding unit used according to an embodiment are terms used to indicate a relation between before and after splitting a coding unit. For example, a second coding unit may be determined by splitting a first coding unit, and a third coding unit may be determined by splitting a second coding unit. Hereinafter, it will be understood that relations between first through third coding units are in accordance with the features described above.

According to an embodiment, the image decoding device 200 may determine the determined second coding unit 1210 to be split or not to be split into coding units, based on at least one of block shape information and split shape information. Referring to FIG. 12, the image decoding device 200 may split the second coding unit 1210, which has a non-square shape and is determined by splitting the first coding unit 1200, into at least one third coding unit 1220a, 1220b, 1220c, or 1220d, or may not split the second coding unit 1210, based on at least one of block shape information and split shape information. The image decoding device 200 may obtain at least one of the block shape information and the split shape information, and obtain a plurality of second coding units (for example, the second coding units 1210) having various shapes by splitting the first coding unit 1200 based on at least one of the obtained block shape information and split shape information, wherein the second coding unit 1210 may be split according to a method of splitting the first coding unit 1200 based on at least one of the block shape information and the split shape information.

According to an embodiment, when the first coding unit 1200 is split into the second coding units 1210 based on at least one of block shape information and split shape information with respect to the first coding unit 1200, the second coding unit 1210 may also be split into third coding units (for example, the third coding units 1220a through 1220d) based on at least one of block shape information and split shape information with respect to the second coding unit 1210. That is, a coding unit may be recursively split based on at least one of split shape information and block shape information related to each coding unit. Accordingly, a square coding unit may be determined from a non-square coding unit, and such a square coding unit may be recursively split such that a non-square coding unit is determined. Referring to FIG. 12, a certain coding unit (for example, a coding unit located at the center or a square coding unit) from among the odd number of third coding units 1220b, 1220c, and 1220d determined when the second coding unit 1210 having a non-square shape is split may be recursively split. According to an embodiment, the third coding unit 1220c having a square shape from among the third coding units 1220b through 1220d may be split in a horizontal direction into a plurality of fourth coding units. A fourth coding unit 1240 having a non-square shape from among the plurality of fourth coding units may be split again into a plurality of coding units. For example, the fourth coding unit 1240 having a non-square shape may be split into an odd number of coding units 1250a, 1250b, and 1250c.

A method that may be used to recursively split a coding unit will be described below through various embodiments.

According to an embodiment, the image decoding device 200 may determine each of the third coding units 1220a, 1220b, 1220c, and 1220d to be split into coding units or may determine the second coding unit 1210 not to be split, based on at least one of block shape information and split shape information. The image decoding device 200 may split the second coding unit 1210 having a non-square shape into the odd number of third coding units 1220b, 1220c, and 1220d, according to an embodiment. The image decoding device 200 may set a certain limit on a certain third coding unit from among the third coding units 1220b, 1220c, and 1220d. For example, the image decoding device 200 may limit that the third coding unit 1220c located at the center of the third coding units 1220b, 1220c, and 1220d is no longer split, or is split into a settable number of times. Referring to FIG. 12, the image decoding device 200 may limit that the third coding unit 1220c located at the center of the third coding units 1220b, 1220c, and 1220d included in the second coding unit 1210 having a non-square shape is no longer split, is split into a certain split shape (for example, split into four coding units or split into shapes corresponding to those into which the second coding unit 1210 is split), or is split only a certain number of times (for example, split only n times wherein n>0). However, such limits on the third coding unit 1220c located at the center are only examples and should not be interpreted as being limited by those examples, but should be interpreted as including various limits as long as the third coding unit 1220c located at the center are decoded differently from the other third coding units 1220b and 1220d.

According to an embodiment, the image decoding device 200 may obtain at least one of block shape information and split shape information used to split a current coding unit from a certain location in the current coding unit.

Figure 13:
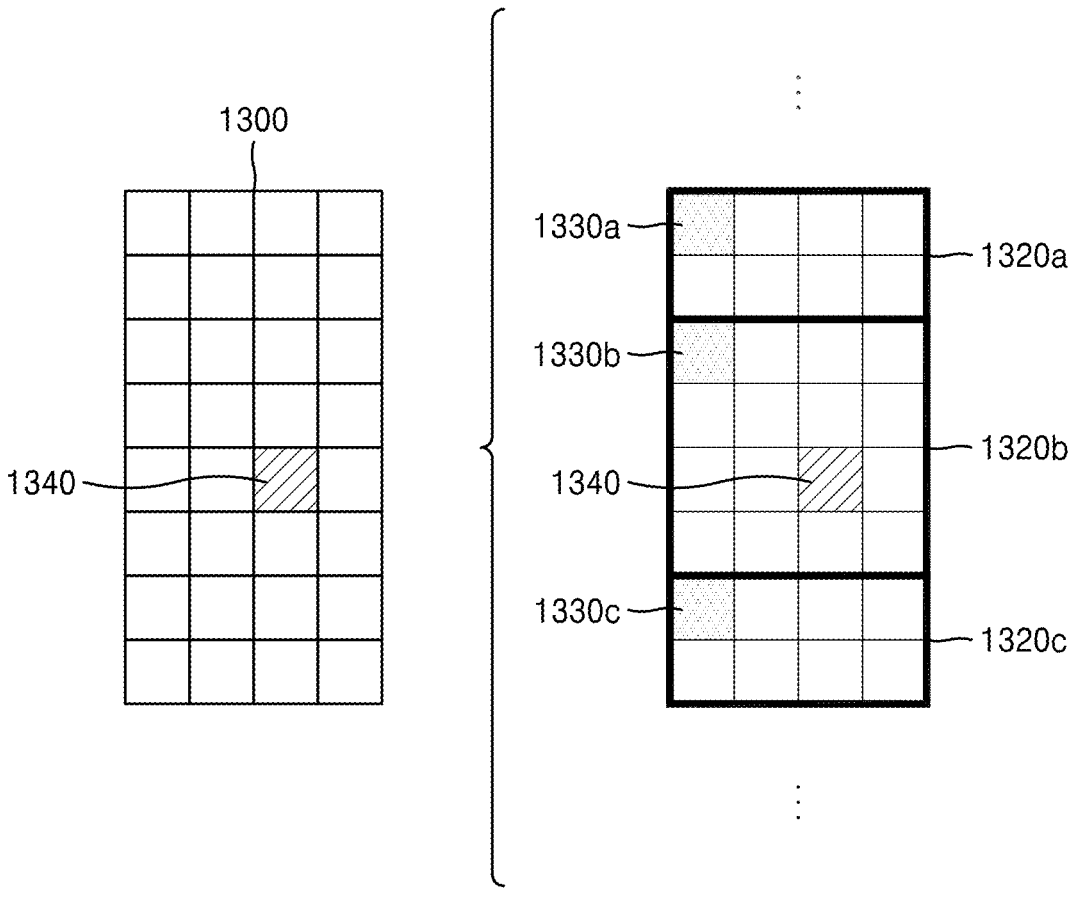
FIG. 13 illustrates a method of determining a certain coding unit from among an odd number of coding units, according to an embodiment.

FIG. 13 illustrates a method of determining, by the image decoding device 200, a certain coding unit from among an odd number of coding units, according to an embodiment.

Referring to FIG. 13, at least one of block shape information and split shape information of a current coding unit 1300 may be obtained from a sample at a certain location (for example, a sample 1340 located at the center) from among a plurality of samples included in the current coding unit 1300. However, the certain location in the current coding unit 1300 from which at least one of block shape information and split shape information is obtained is not limited to the center location shown in FIG. 13, but may be any location (for example, an uppermost location, a lowermost location, a left location, a right location, an upper left location, a lower left location, an upper right location, or a lower right location) included in the current coding unit 1300. The image decoding device 200 may determine that a current coding unit is split into coding units having various shapes and sizes or is not split by obtaining at least one of block shape information and split shape information from a certain location.

According to an embodiment, the image decoding device 200 may select one coding unit when a current coding unit is split into a certain number of coding units. A method of selecting one of a plurality of coding units may vary, and details thereof will be described below through various embodiments.

According to an embodiment, the image decoding device 200 may split a current coding unit into a plurality of coding units, and determine a coding unit at a certain location.

FIG. 13 illustrates a method of determining, by the image decoding device 200, a coding unit at a certain location from among an odd number of coding units, according to an embodiment.

According to an embodiment, the image decoding device 200 may use information indicating a location of each of the odd number of coding units so as to determine a coding unit located at the center from among the odd number of coding units. Referring to FIG. 13, the image decoding device 200 may determine the odd number of coding units 1320a, 1320b, and 1320c by splitting the current coding unit 1300. The image decoding device 200 may determine the center coding unit 1320b by using information about the locations of the odd number of coding units 1320a, 1320b, and 1320c. For example, the image decoding device 200 may determine the coding unit 1320b located at the center by determining the locations of the coding units 1320a, 1320b, and 1320c based on information indicating locations of certain samples included in the coding units 1320a, 1320b, and 1320c. In detail, the image decoding device 200 may determine the coding unit 1320b located at the center by determining the locations of the coding units 1320a, 1320b, and 1320c based on information indicating locations of upper left samples 1330a through 1330c of the coding units 1320a, 1320b, and 1320c.

According to an embodiment, the information indicating the locations of the upper left samples 1330a, 1330b, and 1330c included in the coding units 1320a, 1320b, and 1320c respectively may include information about a location or coordinates of the coding units 1320a, 1320b, and 1320c in a picture. According to an embodiment, the information indicating the locations of the upper left samples 1330a, 1330b, and 1330c included in the coding units 1320a, 1320b, and 1320c respectively may include information indicating widths or heights of the coding units 1320a, 1320b, and 1320c included in the current coding unit 1300, and such widths or heights may correspond to information indicating differences between coordinates of the coding units 1320a, 1320b, and 1320c in a picture. That is, the image decoding device 200 may determine the coding unit

1320b located at the center by directly using the information about the locations or coordinates of the coding units 1320a, 1320b, and 1320c in a picture or by using information about the widths or heights of the coding units corresponding to the differences between coordinates.

According to an embodiment, the information indicating the location of the upper left sample 1330a of the upper coding unit 1320a may indicate (xa, ya) coordinates, the information indicating the location of the upper left sample 1330b of the center coding unit 1320b may indicate (xb, yb) coordinates, and the information indicating the location of the upper left sample 1330c of the lower coding unit 1320c may indicate (xc, yc) coordinates. The image decoding device 200 may determine the center coding unit 1320b by using the coordinates of the upper left samples 1330a, 1330b, and 1330c respectively included in the coding units 1320a, 1320b, and 1320c. For example, when the coordinates of the upper left samples 1330a, 1330b, and 1330c are arranged in an ascending order or descending order, the coding unit 1320b including the coordinates (xb, yb) of the sample 1330b located at the center may be determined as a coding unit located at the center from among the coding units 1320a, 1320b, and 1320c determined when the current coding unit 1300 is split. However, coordinates indicating the locations of the upper left samples 1330a through 1330c may be coordinates indicating absolute locations in a picture, and in addition, (dxb, dyb) coordinates, i.e., information indicating a relative location of the upper left sample 1330b of the center coding unit 1320b, and (dxc, dyc) coordinates, i.e., information indicating a relative location of the upper left sample 1330c of the lower coding unit 1320c, may be used based on the location of the upper left sample 1330a of the upper coding unit 1320a. Also, a method of determining a coding unit at a certain location by using, as information indicating locations of samples included in coding units, coordinates of the samples is not limited to the above, and various arithmetic methods capable of using coordinates of samples may be used.

According to an embodiment, the image decoding device 200 may split the current coding unit 1300 into the plurality of coding units 1320a, 1320b, and 1320c, and select a coding unit from the coding units 1320a through 1320c according to a certain standard. For example, the image decoding device 200 may select the coding unit 1320b having a different size from among the coding units 1320a, 1320b, and 1320c.

According to an embodiment, the image decoding device 200 may determine widths or heights of the coding units 1320a, 1320b, and 1320c by respectively using the (xa, ya) coordinates, i.e., the information indicating the location of the upper left sample 1330a of the upper coding unit 1320a, the (xb, yb) coordinates, i.e., the information indicating the location of the upper left sample 1330b of the center coding unit 1320b, and the (xc, yc) coordinates, i.e., the information indicating the location of the upper left sample 1330c of the lower coding unit 1320c. The image decoding device 200 may determine the sizes of the coding units 1320a, 1320b, and 1320c by respectively using the coordinates (xa, ya), (xb, yb), and (xc, yc) indicating the locations of the coding units 1320a, 1320b, and 1320c.

According to an embodiment, the image decoding device 200 may determine the width of the upper coding unit 1320a to be xb-xa, and the height to be yb-ya. According to an embodiment, the image decoding device 200 may determine the width of the center coding unit 1320b to be xc-xb, and the height to be yc-yb. According to an embodiment, the image decoding device 200 may determine the width or height of the lower coding unit by using the width and height of the current coding unit and the widths and heights of the upper coding unit 1320a and center coding unit 1320b. The image decoding device 200 may determine a coding unit having a different size from other coding units based on the determined widths and heights of the coding units 1320a, 1320b, and 1320c. Referring to FIG. 13, the image decoding device 200 may determine the center coding unit 1320b having a size different from those of the upper coding unit 1320a and lower coding unit 1320c as a coding unit at a certain location. However, processes of the image decoding device 200 determining a coding unit having a different size from other coding units are only an example of determining a coding unit at a certain location by using sizes of coding units determined based on sample coordinates, and thus various processes of determining a coding unit at a certain location by comparing sizes of coding units determined according to certain sample coordinates may be used.

However, a location of a sample considered to determine a location of a coding unit is not limited to the upper left as described above, and information about a location of an arbitrary sample included in a coding unit may be used.

According to an embodiment, the image decoding device 200 may select a coding unit at a certain location from among an odd number of coding units determined when a current coding unit is split, while considering a shape of the current coding unit. For example, when the current coding unit has a non-square shape in which a width is longer than a height, the image decoding device 200 may determine a coding unit at a certain location in a horizontal direction. In other words, the image decoding device 200 may determine one of coding units having a different location in the horizontal direction and set a limit on the one coding unit. When the current coding unit has a non-square shape in which a height is longer than a width, the image decoding device 200 may determine a coding unit at a certain location in a vertical direction. That is, the image decoding device 200 may determine one of coding units having a different location in the vertical direction and set a limit on the one coding unit.

According to an embodiment, the image decoding device 200 may use information indicating a location of each of an even number of coding units so as to determine a coding unit at a certain location from among the even number of coding units. The image decoding device 200 may determine the even number of coding units by splitting a current coding unit, and determine the coding unit at the certain location by using information about the locations of the even number of coding units. Detailed processes thereof may correspond to those of determining a coding unit at a certain location (for example, a center location) from among an odd number of coding units described in FIG. 13, and thus details thereof are not provided again.

According to an embodiment, when a current coding unit having a non-square shape is split into a plurality of coding units, certain information about a coding unit at a certain location during splitting processes may be used to determine the coding unit at the certain location from among the plurality of coding units. For example, the image decoding device 200 may use at least one of block shape information and split shape information stored in a sample included in a center coding unit during splitting processes so as to determine a coding unit located at the center from among a plurality of coding units obtained by splitting a current coding unit.

Referring to FIG. 13, the image decoding device 200 may split the current coding unit 1300 into the plurality of coding units 1320a, 1320b, and 1320c based on at least one of block shape information and split shape information, and determine the coding unit 1320b located at the center from among the plurality of coding units 1320a, 1320b, and 1320c. In addition, the image decoding device 200 may determine the coding unit 1320b located at the center considering a location from which at least one of the block shape information and the split shape information is obtained. That is, at least one of the block shape information and the split shape information of the current coding unit 1300 may be obtained from the sample 1340 located at the center of the current coding unit 1300, and when the current coding unit 1300 is split into the plurality of coding units 1320a, 1320b, and 1320c based on at least one of the block shape information and the split shape information, the coding unit 1320b including the sample 1340 may be determined as a coding unit located at the center. However, information used to determine a coding unit located at the center is not limited to at least one of the block shape information and the split shape information, and various types of information may be used while determining a coding unit located at the center.

According to an embodiment, certain information for identifying a coding unit at a certain location may be obtained from a certain sample included in a coding unit to be determined. Referring to FIG. 13, the image decoding device 200 may use at least one of block shape information and split shape information obtained from a sample at a certain location in the current coding unit 1300 (for example, a sample located at the center of the current coding unit 1300), so as to determine a coding unit at a certain location (for example, a coding unit located at the center from among a plurality of coding units) from among the plurality of coding units 1320a, 1320b, and 1320c determined when the current coding unit 1300 is split. That is, the image decoding device 200 may determine the sample at the certain location considering a block shape of the current coding unit 1300, and determine and set a certain limit on the coding unit 1320b including a sample from which certain information (for example, at least one of block shape information and split shape information) is obtainable, from among the plurality of coding units 1320a, 1320b, and 1320c determined when the current coding unit 1300 is split. Referring to FIG. 13, according to an embodiment, the image decoding device 200 may determine, as a sample from which certain information is obtainable, the sample 1340 located at the center of the current coding unit 1300, and set a certain limit on the coding unit 1320b including such a sample 1340 during decoding processes. However, a location of a sample from which certain information is obtainable is not limited to the above, and may be a sample at an arbitrary location included in the coding unit 1320b determined to set a limit.

According to an embodiment, a location of a sample from which certain information is obtainable may be determined according to a shape of the current coding unit 1300. According to an embodiment, block shape information may determine whether a shape of a current coding unit is square or non-square, and determine a location of a sample from which certain information is obtainable according to the shape. For example, the image decoding device 200 may determine, as a sample from which certain information is obtainable, a sample located on a boundary of splitting at least one of a width and a height of a current coding unit into halves by using at least one of information about the width of the current coding unit and information about the height of the current coding unit. As another example, when block shape information related to a current coding unit indicates a non-square shape, the image decoding device 200 may determine, as a sample from which certain information is obtainable, one of samples adjacent to a boundary of splitting long sides of the current coding unit into halves.

According to an embodiment, when a current coding unit is split into a plurality of coding units, the image decoding device 200 may use at least one of block shape information and split shape information so as to determine a coding unit at a certain location from among the plurality of coding units. According to an embodiment, the image decoding device 200 may obtain at least one of block shape information and split shape information from a sample at a certain location included in a coding unit, and may split a plurality of coding units generated as a current coding unit is split by using at least one of the split shape information and the block shape information obtained from the sample at the certain location included in each of the plurality of coding units. That is, a coding unit may be recursively split by using at least one of block shape information and split shape information obtained from a sample at a certain location included in each coding unit. Since processes of recursively splitting a coding unit have been described above with reference to FIG. 12, details thereof are not provided again.

According to an embodiment, the image decoding device 200 may determine at least one coding unit by splitting a current coding unit, and determine an order of decoding the at least one coding unit according to a certain block (for example, the current coding unit).

Figure 14:
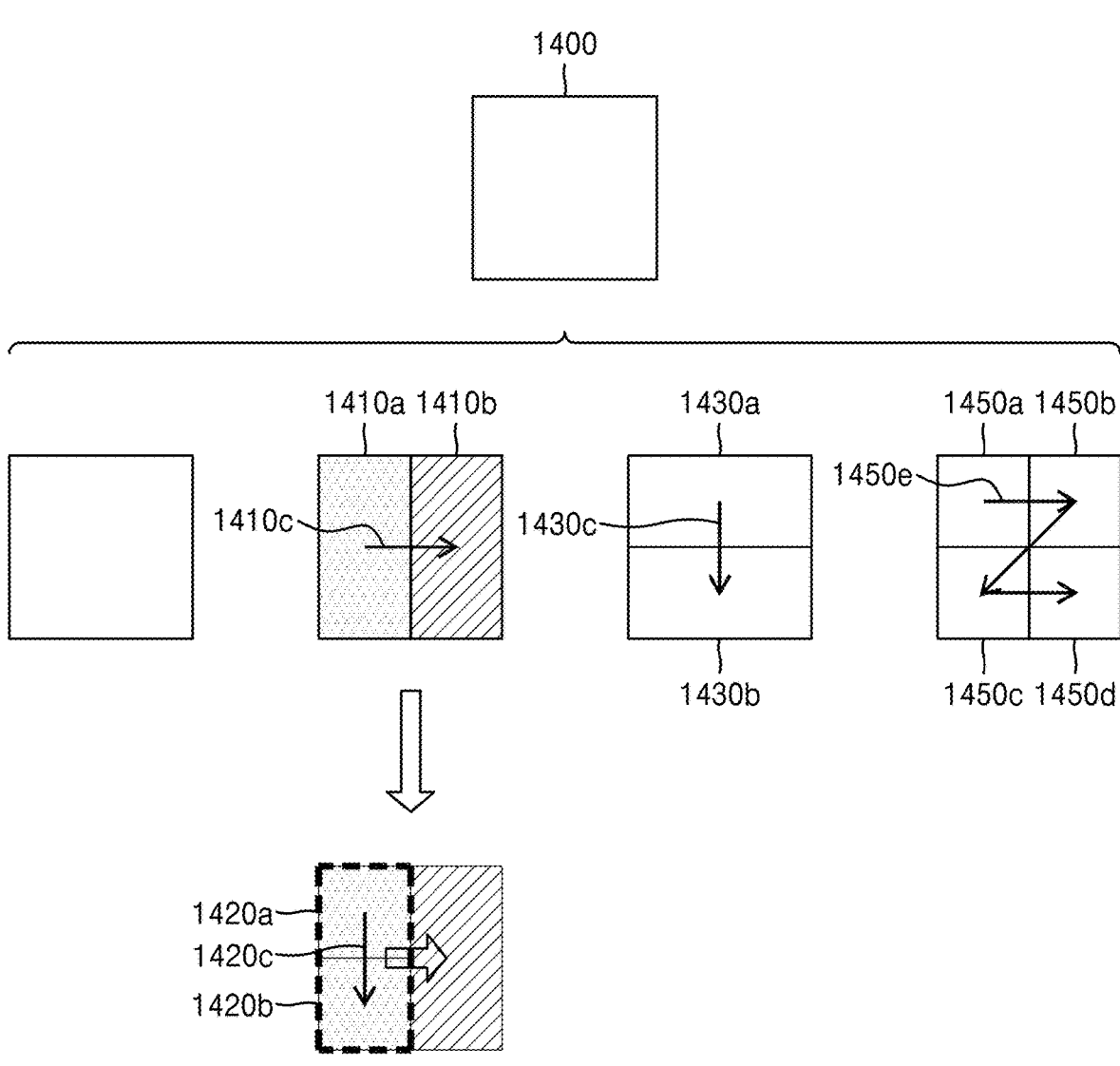
FIG. 14 illustrates an order of processing a plurality of coding units when the plurality of coding units are determined by splitting a current coding unit, according to an embodiment.

FIG. 14 illustrates an order of processing a plurality of coding units when the plurality of coding units are determined when the image decoding device 200 splits a current coding unit, according to an embodiment.

According to an embodiment, the image decoding device 200 may determine second coding units 1410a and 1410b by splitting a first coding unit 1400 in a vertical direction, determine second coding units 1430a and 1430b by splitting the first coding unit 1400 in a horizontal direction, or determine second coding units 1450a, 1450b, 1450c, and 1450d by splitting the first coding unit 140 in horizontal and vertical directions, according to block shape information and split shape information.

Referring to FIG. 14, the image decoding device 200 may determine the second coding units 1410a and 1410b, which are determined by splitting the first coding unit 1400 in the vertical direction, to be processed in a horizontal direction 1410c. The image decoding device 200 may determine the second coding units 1430a and 1430b, which are determined by splitting the first coding unit 1400 in the horizontal direction, to be processed in a vertical direction 1430c. The image decoding device 200 may determine the second coding units 1450a, 1450b, 1450c, and 1450d, which are determined by splitting the first coding unit 1400 in the vertical and horizontal directions, to be processed according to a certain order in which coding units located in one row is processed and then coding units located in a next row is processed (for example, a raster scan order or a z-scan order 1450e).

According to an embodiment, the image decoding device 200 may recursively split coding units. Referring to FIG. 14, the image decoding device 200 may determine the plurality of second coding units 1410a and 1410b, 1430a and 1430b, or 1450a, 1450b, 1450c, and 1450d by splitting the first coding unit 1400, and recursively split each of the plurality of second coding units 1410a and 1410b, 1430a and 1430b, or 1450a, 1450b, 1450c, and 1450d. A method of splitting the plurality of second coding units 1410a and 1410b, 1430a and 1430b, or 1450a, 1450b, 1450c, and 1450d may correspond to a method of splitting the first coding unit 1400.

Accordingly, each of the plurality of second coding units 1410a and 1410b, 1430a and 1430b, or 1450a, 1450b, 1450c, and 1450d may be independently split into a plurality of coding units. Referring to FIG. 14, the image decoding device 200 may determine the second coding units 1410a and 1410b by splitting the first coding unit 1400 in the vertical direction, and in addition, determine each of the second coding units 1410a and 1410b to be independently split or not split.

According to an embodiment, the image decoding device 200 may split the second coding unit 1410a at the left in a horizontal direction into third coding units 1420a and 1420b, and may not split the second coding unit 1410b at the right.

According to an embodiment, an order of processing coding units may be determined based on split processes of coding units. In other words, an order of processing coding units that are split may be determined based on an order of processing coding units before being split. The image decoding device 200 may determine an order of processing the third coding units 1420a and 1420b determined when the second coding unit 1410a at the left is split independently from the second coding unit 1410b at the right. Since the third coding units 1420a and 1420b are determined when the second coding unit 1410a at the left is split in a horizontal direction, the third coding units 1420a and 1420b may be processed in a vertical direction 1420c. Also, since an order of processing the second coding unit 1410a at the left and the second coding unit 1410b at the right corresponds to the horizontal direction 1410c, the second coding unit 1410b at the right may be processed after the third coding units 1420a and 1420b included in the second coding unit 1410a at the left are processed in the vertical direction 1420c. The above descriptions are related processes of determining an order of processing coding units according to coding units before being split, but such processes are not limited to the above embodiments, and any method of independently processing, in a certain order, coding units split into various shapes may be used.

Figure 15:
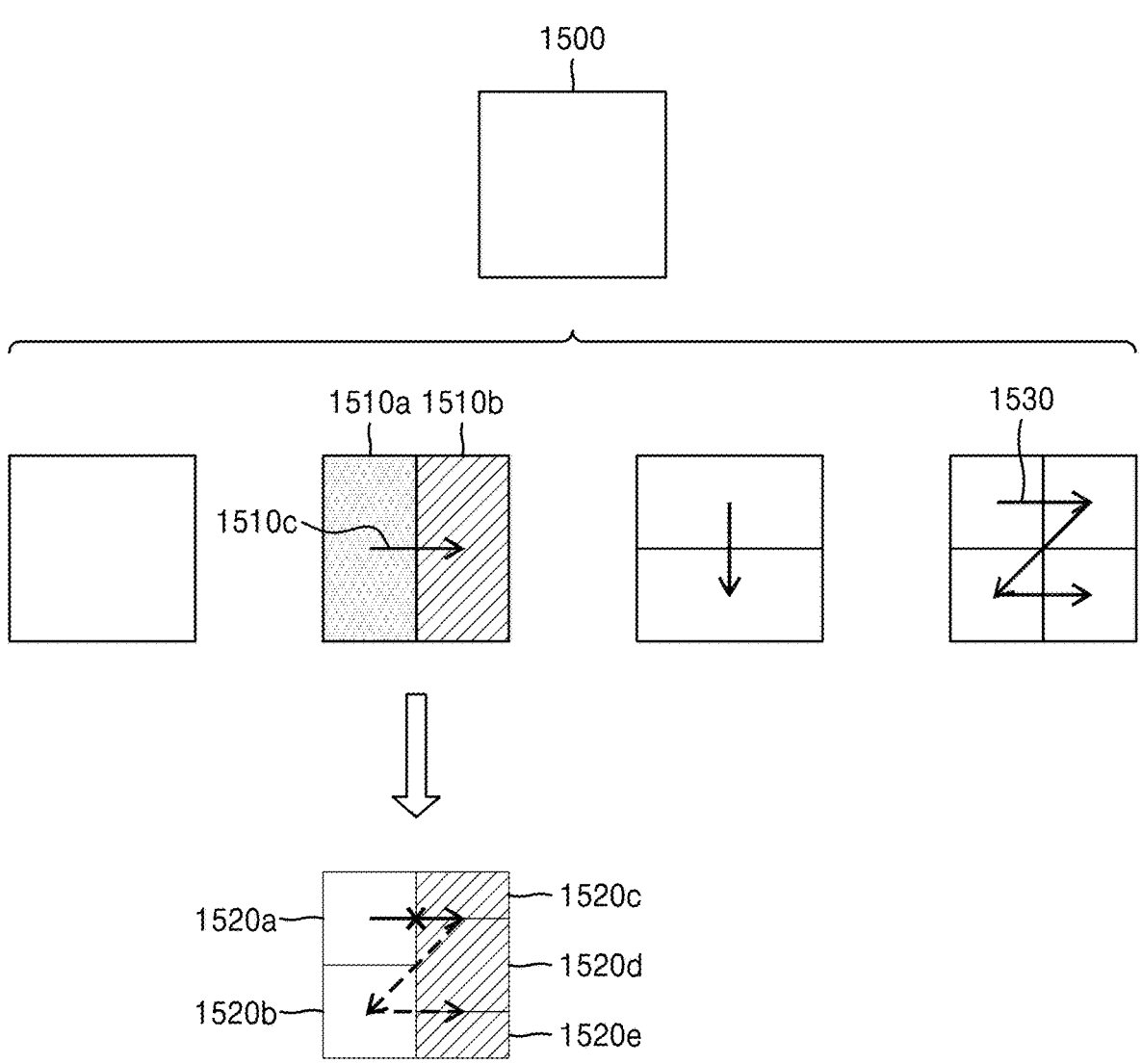
FIG. 15 illustrates processes of determining that a current coding unit is split into an odd number of coding units when coding units are not processable in a certain order, according to an embodiment.

FIG. 15 illustrates processes of determining that a current coding unit is split into an odd number of coding units when coding units are not processable in a certain order by the image decoding device 200, according to an embodiment.

According to an embodiment, the image decoding device 200 may determine that a current coding unit is split into an odd number of coding units based on obtained block shape information and split shape information. Referring to FIG. 15, a first coding unit 1500 having a square shape may be split into second coding units 1510a and 1510b having a non-square shape, and the second coding units 1510a and 1510b may be independently respectively split into third coding units 1520a and 1520b, and 1520c, 1520d, and 1520e. According to an embodiment, the image decoding device 200 may split the second coding unit 1510a at the left from among the second coding units 1510a and 1510b into a horizontal direction to determine the plurality of third coding units 1520a and 1520b, and split the second coding unit 1510b at the right into the odd number of third coding units 1520c, 1520d, and 1520e.

According to an embodiment, the image decoding device 200 may determine whether a coding unit split into an odd number exists by determining whether the third coding units 1520a, 1520b, 1520c, 1520d, and 1520e are processable in a certain order. Referring to FIG. 15, the image decoding device 200 may determine the third coding units 1520a through 1520e by recursively splitting the first coding unit 1500. The image decoding device 200 may determine whether any of the first coding unit 1500, the second coding units 1510*a* and 1510*b*, and the third coding units 1520*a* and 1520*b*, and 1520*c* to 1520*e* is split into an odd number of coding units, based on at least one of the block shape information and the split shape information. For example, the second coding unit 1510*b* at the right from among the second coding units 1510*a* and 1510*b* may be split into the odd number of third coding units 1520*c* through 1520*e*. An order of processing a plurality of coding units included in the first coding unit 1500 may be a certain order (for example, a z-scan order 1530), and the image decoding device 200 may determine whether the third coding units 1520*c*, 1520*d*, and 1520*e* determined when the second coding unit 1510*b* at the right is split into an odd number satisfy a condition of being processable according to the certain order.

According to an embodiment, the image decoding device 200 may determine whether the third coding units 1520*a*, 1520*b*, 1520*c*, 1520*d*, and 1520*e* included in the first coding unit 1500 satisfy a condition of being processable according to a certain order, wherein the condition is related to whether at least one of a width and a height of each of the second coding units 1510*a* and 1510*b* is split into halves according to boundaries of the third coding units 1520*a*, 1520*b*, 1520*c*, 1520*d*, and 1520*e*. For example, the third coding units 1520*a* and 1520*b* determined when the height of the second coding unit 1510*a* at the left and having a non-square shape is split into halves satisfy the condition, but it may be determined that the third coding units 1520*c*, 1520*d*, and 1520*e* do not satisfy the condition because the boundaries of the third coding units 1520*c*, 1520*d*, and 1520*e* that are determined when the second coding unit 1510*b* at the right is split into three coding units do not split the width or height of the second coding unit 1510*b* at the right into halves. The image decoding device 200 may determine disconnection of a scan order when the condition is not satisfied, and determine that the second coding unit 1510*b* at the right is split into the odd number of coding units, based on a result of the determination. According to an embodiment, the image decoding device 200 may set a certain limit on a coding unit at a certain location from among an odd number of coding units obtained by splitting a coding unit, and since such a limit or certain location has been described above through various embodiments, details thereof are not provided again.

Figure 16:
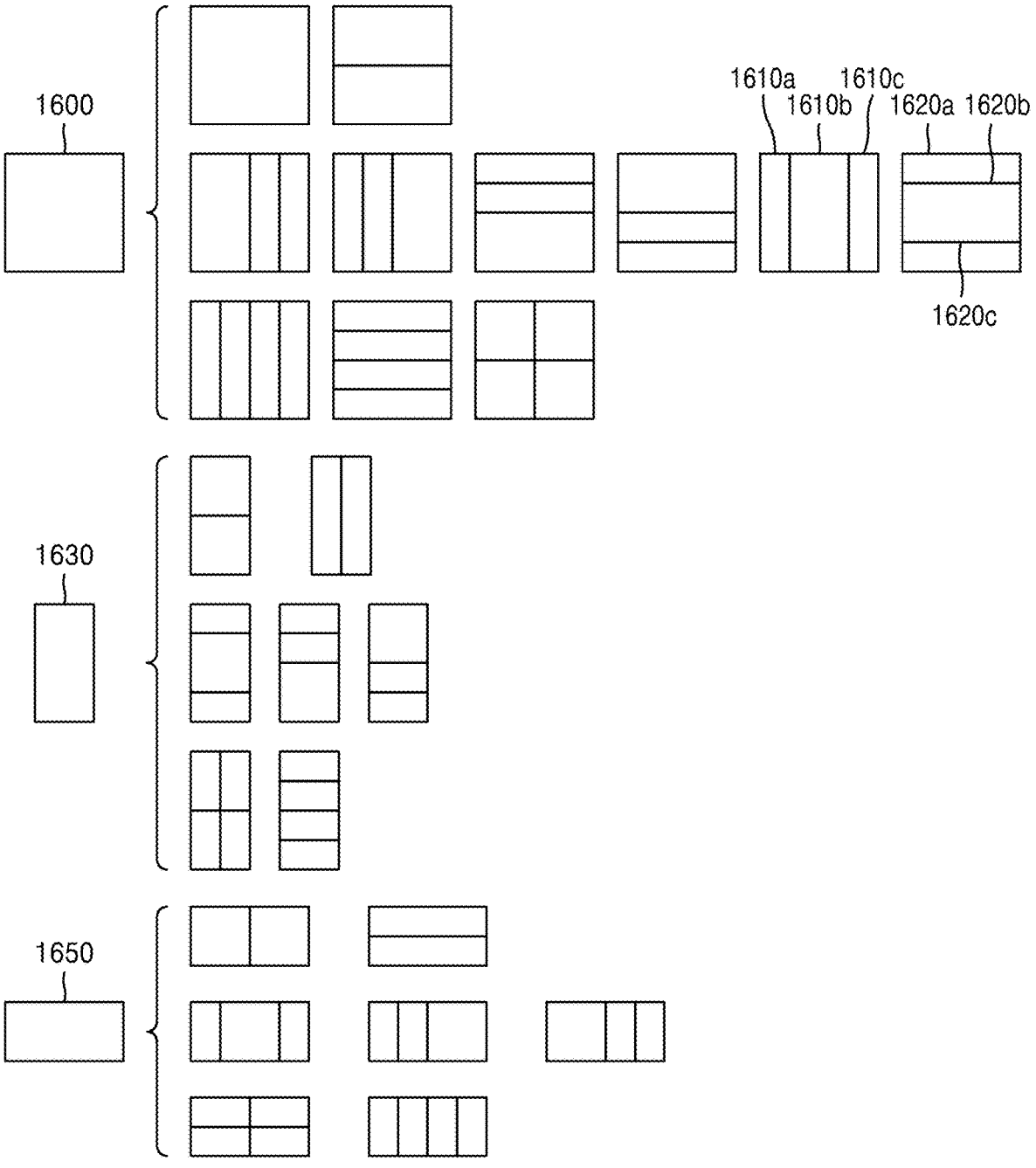
FIG. 16 illustrates processes of determining at least one coding unit by splitting a first coding unit, according to an embodiment.

FIG. 16 illustrates processes of determining at least one coding unit when the image decoding device 200 splits a first coding unit 1600, according to an embodiment. According to an embodiment, the image decoding device 200 may split the first coding unit 1600 based on at least one of block shape information and split shape information obtained through the receiver 210. The first coding unit 1600 having a square shape may be split into four coding units having a square shape or a plurality of coding units having a non-square shape. For example, referring to FIG. 16, when block shape information indicates that the first coding unit 1600 is a square and split shape information indicates a split into non-square coding units, the image decoding device 200 may split the first coding unit 1600 into a plurality of non-square coding units. In detail, when split shape information indicates that an odd number of coding units are determined by splitting the first coding unit 1600 in a horizontal direction or a vertical direction, the image decoding device 200 may determine, as the odd number of coding units, second coding units 1610*a*, 1610*b*, and 1610*c* by splitting the first coding unit 1600 having a square shape in a vertical direction, or second coding units 1610*a*, 1610*b*, and 1610*c* by splitting the first coding unit 1600 in a horizontal direction.

According to an embodiment, the image decoding device 200 may determine whether the second coding units 1610*a*, 1610*b*, and 1610*c*, and 1620*a*, 1620*b*, and 1620*c* included in the first coding unit 1600 satisfy a condition of being processable in a certain order, wherein the condition is related to whether at least one of a width and a height of the first coding unit 1600 is split into halves according to boundaries of the second coding units 1610*a*, 1610*b*, and 1610*c*, and 1620*a*, 1620*b*, and 1620*c*. Referring to FIG. 16, since the boundaries of the second coding units 1610*a*, 1610*b*, and 1610*c* determined when the first coding unit 1600 having a square shape is split in a vertical direction do not split the width of the first coding unit 1600 into halves, it may be determined that the first coding unit 1600 does not satisfy the condition of being processable in a certain order. Also, since the boundaries of the second coding units 1620*a*, 1620*b*, and 1620*c* determined when the first coding unit 1600 having a square shape is split in a horizontal direction do not split the height of the first coding unit 1600 into halves, it may be determined that the first coding unit 1600 does not satisfy the condition of being processable in a certain order. The image decoding device 200 may determine disconnection of a scan order when the condition is not satisfied, and determine that the first coding unit 1600 is split into the odd number of coding units based on a result of the determination. According to an embodiment, the image decoding device 200 may set a certain limit on a coding unit at a certain location from among an odd number of coding units obtained by splitting a coding unit, and since such a limit or certain location has been described above through various embodiments, details thereof are not provided again.

According to an embodiment, the image decoding device 200 may determine coding units having various shapes by splitting a first coding unit.

Referring to FIG. 16, the image decoding device 200 may split the first coding unit 1600 having a square shape and a first coding unit 1630 or 1650 having a non-square shape into coding units having various shapes.

Figure 17:
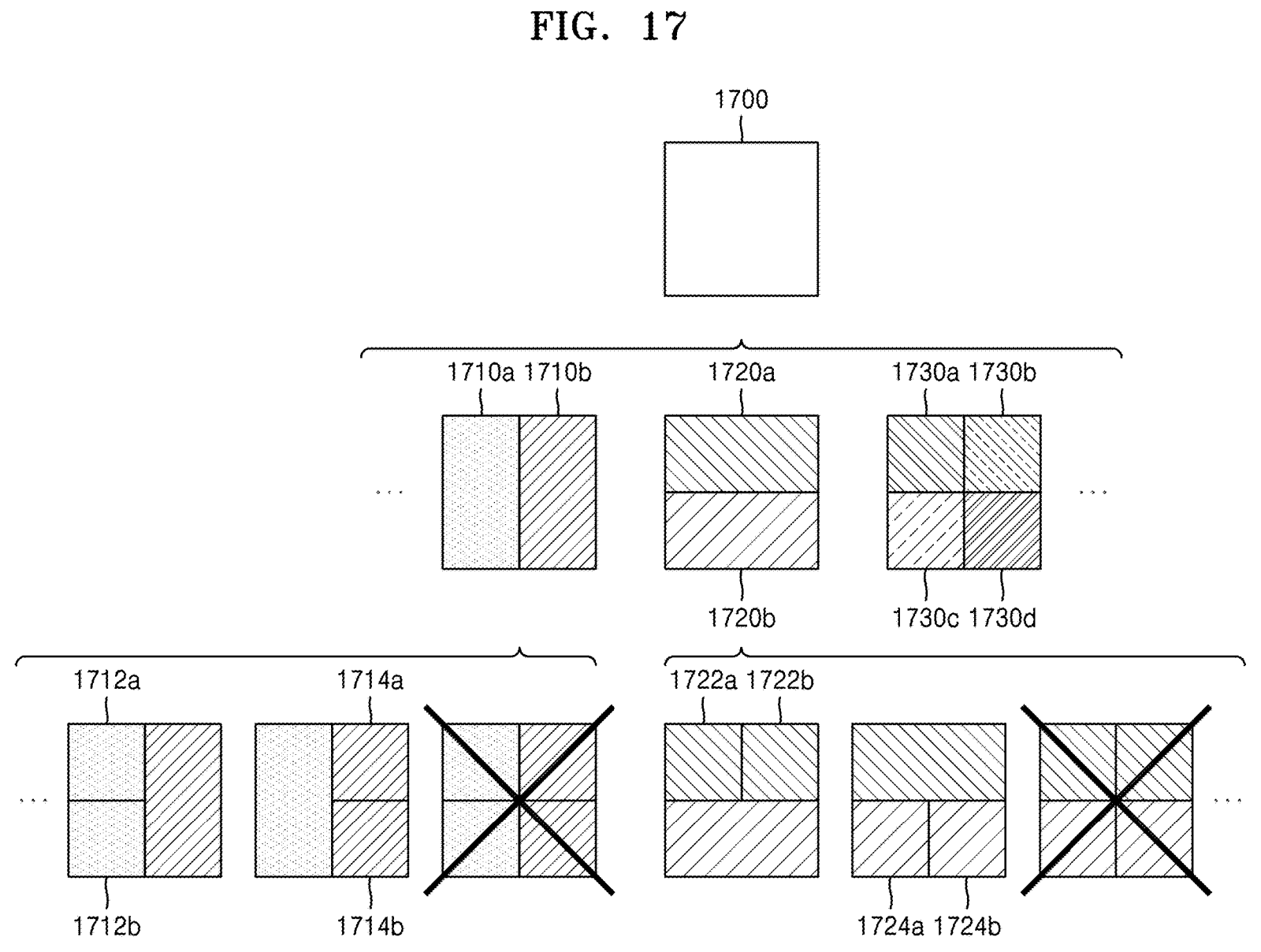

FIG. 17 illustrates that a shape into which a second coding unit is splittable by the image decoding device 200 is restricted when the second coding unit having a non-square shape determined when a first coding unit 1700 is split satisfies a certain condition, according to an embodiment.

According to an embodiment, the image decoding device 200 may determine that the first coding unit 1700 having a square shape is split into second coding units 1710*a* and 1710*b* or 1720*a* and 1720*b* having a non-square shape, based on at least one of block shape information and split shape information obtained through the receiver 210. The second coding units 1710*a* and 1710*b* or 1720*a* and 1720*b* may be independently split. Accordingly, the image decoding device 200 may determine that the second coding units 1710*a* and 1710*b* or 1720*a* and 1720*b* are split into a plurality of coding units or are not split based on at least one of block shape information and split shape information related to each of the coding units 1710*a* and 1710*b* or 1720*a* and 1720*b*. According to an embodiment, the image decoding device 200 may determine third coding units 1712*a* and 1712*b* by splitting, in a horizontal direction, the second coding unit 1710*a* at the left having a non-square shape, which is determined when the first coding unit 1700 is split in a vertical direction. However, when the second coding unit 1710*a* at the left is split in the horizontal direction, the image decoding device 200 may set a limit that the second coding unit 1710*b* at the right is not split in the horizontal direction like the second coding unit 1710*a* at the left. When third coding units 1714*a* and 1714*b* are determined when the second coding unit 1710*b* at the right is split in the same direction, (i.e., the horizontal direction), the third coding units 1712*a*, 1712*b*, 1714*a*, and 1714*b* are determined when the second coding units 1710*a* at the left and the second coding unit 1710*b* at the right are each independently split in the horizontal direction. However, this is the same result as splitting the first coding unit 1700 into four second coding units 1730*a*, 1730*b*, 1730*c*, and 1730*d* having a square shape based on at least one of block shape information and split shape information, and thus may be inefficient in terms of image decoding.

According to an embodiment, the image decoding device 200 may determine third coding units 1722*a* and 1722*b* or 1724*a*, and 1724*b* by splitting, in a vertical direction, the second coding unit 1720*a* or 1720*b* having a non-square shape determined when the first coding unit 1700 is split in the horizontal direction. However, when one of second coding units (for example, the second coding unit 1720*a* at the top) is split in a vertical direction, the image decoding device 200 may set a limit that the other second coding unit (for example, the second coding unit 1720*b* at the bottom) is not split in the vertical direction like the second coding unit 1720*a* at the top for the above described reasons.

Figure 18:
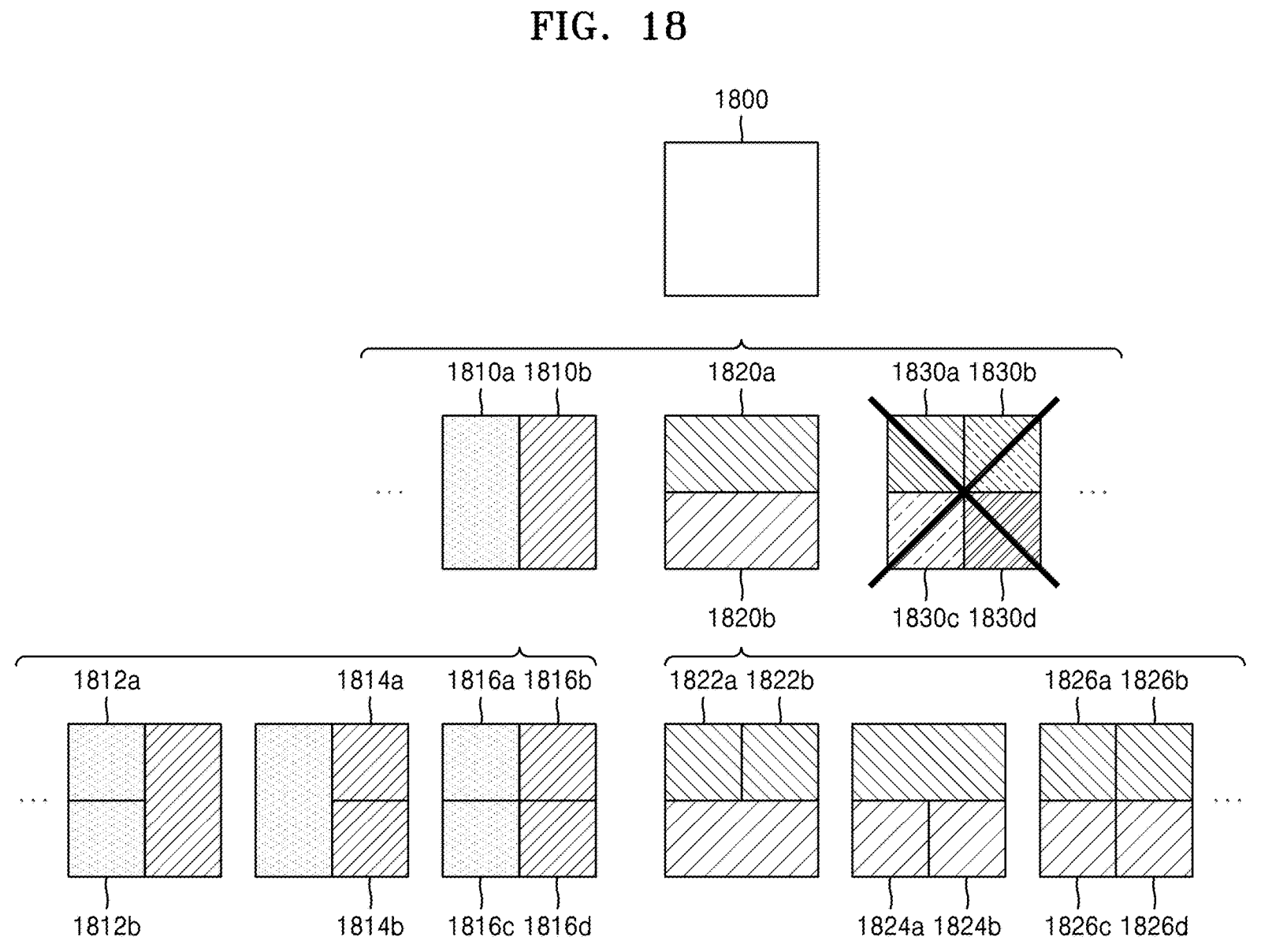

FIG. 18 illustrates processes of the image decoding device 200 splitting a coding unit having a square shape when split shape information is unable to indicate that a coding unit is split into four square shapes, according to an embodiment.

According to an embodiment, the image decoding device 200 may determine second coding units 1810*a* and 1810*b*, or 1820*a* and 1820*b*, by splitting a first coding unit 1800 based on at least one of block shape information and split shape information. Split shape information may include information about various shapes into which a coding unit may be split, but such information about various shapes may not include information for splitting a coding unit into four square coding units. According to such split shape information, the image decoding device 200 is unable to split the first coding unit 1800 having a square shape into four second coding units 1830*a*, 1830*b*, 1830*c*, and 1830*d* having a square shape. The image decoding device 200 may determine the second coding units 1810*a* and 1810*b*, or 1820*a* and 1820*b* having a non-square shape based on the split shape information.

According to an embodiment, the image decoding device 200 may independently split each of the second coding units 1810*a* and 1810*b*, or 1820*a* and 1820*b* having a non-square shape. Each of the second coding units 1810*a* and 1810*b*, or 1820*a* and 1820*b* may be split in a certain order via a recursive method that may be a splitting method corresponding to a method of splitting the first coding unit 1800 based on at least one of the block shape information and the split shape information.

For example, the image decoding device 200 may determine third coding units 1812*a* and 1812*b* having a square shape by splitting the second coding unit 1810*a* at the left in a horizontal direction, or determine third coding units 1814*a* and 1814*b* having a square shape by splitting the second coding unit 1810*b* at the right in a horizontal direction. In addition, the image decoding device 200 may determine third coding units 1816*a* through 1816*d* having a square shape by splitting both the second coding unit 1810*a* at the left and the second coding unit 1810*b* at the right in the horizontal direction. In this case, coding units may be determined in the same manner as when the first coding unit 1800 is split into four second coding units 1830*a* through 1830*d* having a square shape.

As another example, the image decoding device 200 may determine third coding units 1822*a* and 1822*b* having a square shape by splitting the second coding unit 1820*a* at the top in a vertical direction, and determine third coding units 1824*a* and 1824*b* having a square shape by splitting the second coding unit 1820*b* at the bottom in a vertical direction. In addition, the image decoding device 200 may determine third coding units 1826*a*, 1826*b*, 1826*c*, and 1826*d* having a square shape by splitting both the second coding unit 1820*a* at the top and the second coding unit 1820*b* at the bottom in the vertical direction. In this case, coding units may be determined in the same manner as when the first coding unit 1800 is split into four second coding units 1830*a*, 1830*b*, 1830*c*, and 1830*d* having a square shape.

Figure 19:
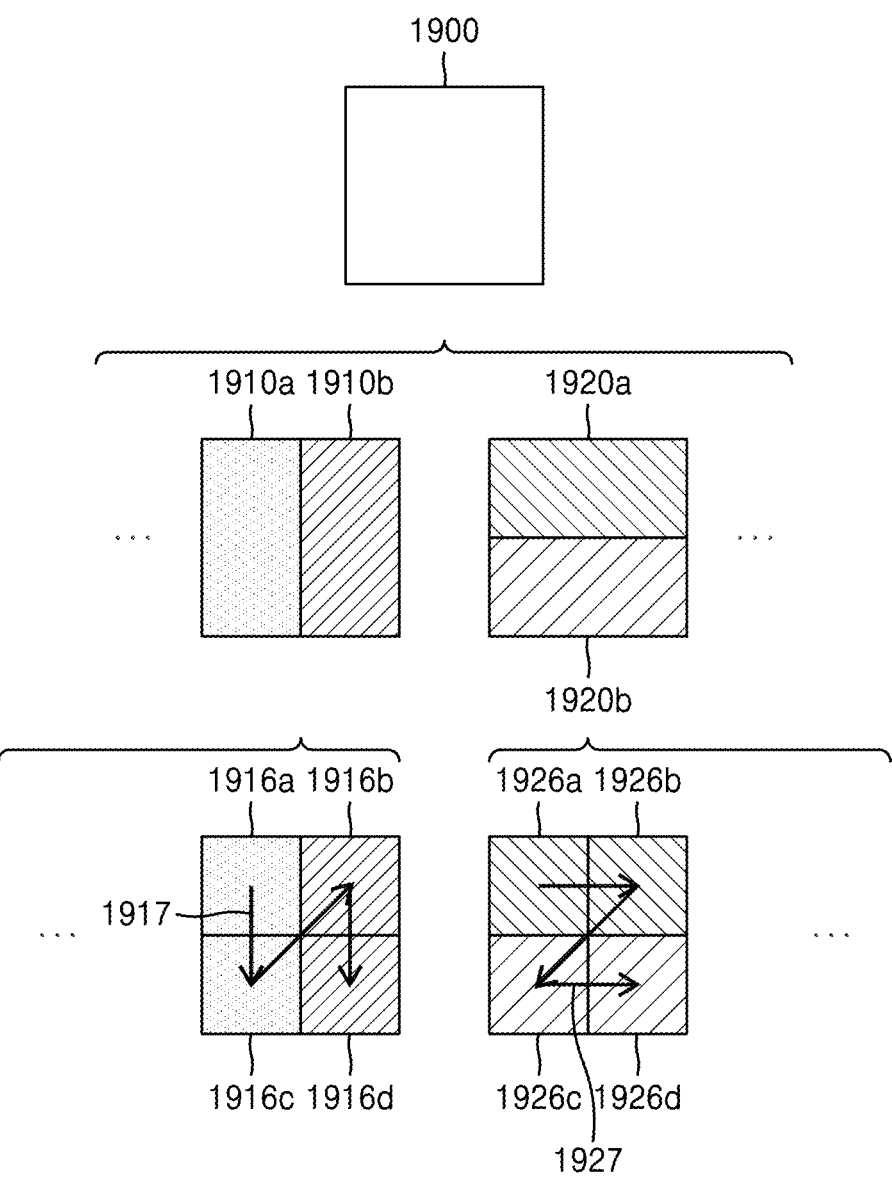
FIG. 19 illustrates that an order of processing a plurality of coding units may be changed according to processes of splitting a coding unit, according to an embodiment.

FIG. 19 illustrates that an order of processing a plurality of coding units may be changed according to processes of splitting a coding unit, according to an embodiment.

According to an embodiment, the image decoding device 200 may split a first coding unit 1900 based on block shape information and split shape information. When the block shape information indicates a square shape and the split shape information indicates that the first coding unit 1900 is split in at least one of a horizontal direction and a vertical direction, the image decoding device 200 may split the first coding unit 1900 to determine second coding units 1910*a* and 1910*b*, 1920*a* and 1920*b*, or 1930*b*, 1930*c*, and 1930*d*. Referring to FIG. 19, the second coding units 1910*a* and 1910*b*, or 1920*a* and 1920*b* having a non-square shape and determined when the first coding unit 1900 is split in the horizontal direction or the vertical direction may each be independently split based on block shape information and split shape information. For example, the image decoding device 200 may determine third coding units 1916*a*, 1916*b*, 1916*c*, and 1916*d* by splitting, in the horizontal direction, each of the second coding units 1910*a* and 1910*b* generated as the first coding unit 1900 is split in the vertical direction, or may determine third coding units 1926*a*, 1926*b*, 1926*c*, and 1926*d* by splitting, in the vertical direction, the second coding units 1920*a* and 1920*b* generated as the first coding unit 1900 is split in the vertical direction. Processes of splitting the second coding units 1910*a* and 1910*b*, or 1920*a* and 1920*b* have been described above with reference to FIG. 17, and thus details thereof are not provided again.

According to an embodiment, the image decoding device 200 may process coding units according to a certain order. Features about processing coding units according to a certain order have been described above with reference to FIG. 14, and thus details thereof are not provided again. Referring to FIG. 19, the image decoding device 200 may determine four third coding units 1916*a*, 1916*b*, 1916*c*, and 1916*d* or 1926*a*, 1926*b*, 1926*c*, and 1926*d* having a square shape by splitting the first coding unit 1900 having a square shape. According to an embodiment, the image decoding device 200 may determine an order of processing the third coding units 1916*a*, 1916*b*, 1916*c*, and 1916*d* or 1926*a*, 1926*b*, 1926*c*, and 1926*d* based on how the first coding unit 1900 is split.

According to an embodiment, the image decoding device 200 may determine the third coding units 1916*a*, 1916*b*, 1916*c*, and 1916*d* by splitting, in the horizontal direction, the second coding units 1910*a* and 1910*b* generated as the first coding unit 1900 is split in the vertical direction, and may process the third coding units 1916*a*, 1916*b*, 1916*c*, and 1916*d* according to an order 1917 of first processing, in the vertical direction, the third coding units 1916*a* and 1916*c* included in the second coding unit 1910*a* at the left, and then processing, in the vertical direction, the third coding units 1916*b* and 1916*d* included in the second coding unit 1910*b* at the right.

According to an embodiment, the image decoding device 200 may determine the third coding units 1926*a* through 1926*d* by splitting, in the vertical direction, the second coding units 1920*a* and 1920*b* generated as the first coding unit 1900 is split in the horizontal direction, and process the third coding units 1926*a* through 1926*d* according to an order 1927 of first processing, in the horizontal direction, the third coding units 1926*a* and 1926*b* included in the second coding unit 1920*a* at the top, and then processing, in the horizontal direction, the third coding units 1926*c* and 1926*d* included in the second coding unit 1920*b* at the bottom.

Referring to FIG. 19, the third coding units 1916*a* through 1916*d* or 1926*a* through 1926*d* having a square shape may be determined when the second coding units 1910*a* and 1910*b*, or 1920*a* and 1920*b* are each split. The second coding units 1910*a* and 1910*b* determined when the first coding unit 1900 is split in the vertical direction and the second coding units 1920*a* and 1920*b* determined when the first coding unit 1900 is split in the horizontal direction are split in different shapes, but according to the third coding units 1916*a* through 1916*d* and 1926*a* through 1926*d* determined afterwards, the first coding unit 1900 is split in coding units having same shapes. Accordingly, the image decoding device 200 may process pluralities of coding units determined in same shapes in different orders even when the coding units having the same shapes are consequently determined when coding units are recursively split through different processes based on at least one of block shape information and split shape information.

FIG. 20 illustrates processes of determining a depth of a coding unit as a shape and size of the coding unit are changed, when a plurality of coding units are determined as the coding unit is recursively split, according to an embodiment.

According to an embodiment, the image decoding device 200 may determine a depth of a coding unit according to a certain standard. For example, the certain standard may be a length of a long side of the coding unit. When a length of a long side of a current coding unit is split by 2n times shorter than a length of a long side of a coding unit before split, it may be determined that a depth of the current coding unit is increased by n times than a depth of the coding unit before split, wherein n>0. Hereinafter, a coding unit having an increased depth is referred to as a coding unit of a lower depth.

Referring to FIG. 20, the image decoding device 200 may determine a second coding unit 2002 and a third coding unit 2004 of lower depths by splitting a first coding unit 2000 having a square shape, based on block shape information indicating a square shape (for example, block shape information may indicate '0:SQUARE'), according to an embodiment. When a size of the first coding unit 2000 having a square shape is 2N×2N, the second coding unit 2002 determined by splitting a width and a height of the first coding unit 2000 by $\frac{1}{2}^1$ may have a size of N×N. In addition, the third coding unit 2004 determined by splitting a width and a height of the second coding unit 2002 by $\frac{1}{2}$ may have a size of N/2×N/2. In this case, a width and a height of the third coding unit 2004 corresponds to $\frac{1}{2}^2$ of the first coding unit 2000. When a depth of the first coding unit 2000 is D, a depth of the second coding unit 2002 having $\frac{1}{2}^1$ of the width and the height of the first coding unit 2000 may be D+1, and a depth of the third coding unit 2004 having $\frac{1}{2}^2$ of the width and the height of the first coding unit 2000 may be D+2.

According to an embodiment, the image decoding device 200 may determine a second coding unit 2012 or 2022 and a third coding unit 2014 or 2024 by splitting a first coding unit 2010 or 2020 having a non-square shape, based on block shape information indicating a non-square shape (for example, block shape information may indicate '1:NS-_VER' indicating a non-square shape in which a height is longer than a width, or '2:NS_HOR' indicating a non-square shape in which a width is longer than a height), according to an embodiment.

The image decoding device 200 may determine a second coding unit (for example, the second coding unit 2002, 2012, or 2022) by splitting at least one of a width and a height of the first coding unit 2010 having a size of N×2N. That is, the image decoding device 200 may determine the second coding unit 2002 having a size of N×N or the second coding unit 2022 having a size of N×N/2 by splitting the first coding unit 2010 in a horizontal direction, or determine the second coding unit 2012 having a size of N/2×N by splitting the first coding unit 2010 in horizontal and vertical directions.

According to an embodiment, the image decoding device 200 may determine a second coding unit (for example, the second coding unit 2002, 2012, or 2022) by splitting at least one of a width and a height of the first coding unit 2020 having a size of 2N×N. That is, the image decoding device 200 may determine the second coding unit 2002 having a size of N×N or the second coding unit 2012 having a size of N/2×N by splitting the first coding unit 200 in a vertical direction, or determine the second coding unit 2022 having a size of N×N/2 by splitting the first coding unit 2010 in horizontal and vertical directions.

According to an embodiment, the image decoding device 200 may determine a third coding unit (for example, the third coding unit 2004, 2014, or 2024) by splitting at least one of a width and a height of the second coding unit 2002 having a size of N×N. That is, the image decoding device 200 may determine the third coding unit 2004 having a size of N/2×N/2, the third coding unit 2014 having a size of N/2²×N/2, or the third coding unit 2024 having a size of N/2×N/2² by splitting the second coding unit 2002 in vertical and horizontal directions.

According to an embodiment, the image decoding device 200 may determine a third coding unit (for example, the third coding unit 2004, 2014, or 2024) by splitting at least one of a width and a height of the second coding unit 2012 having a size of N/2×N. That is, the image decoding device 200 may determine the third coding unit 2004 having a size of N/2×N/2 or the third coding unit 2024 having a size of N/2×N/2² by splitting the second coding unit 2012 in a horizontal direction, or the third coding unit 2014 having a size of N/2²×N/2 by splitting the second coding unit 2012 in vertical and horizontal directions.

According to an embodiment, the image decoding device 200 may determine a third coding unit (for example, the third coding unit 2004, 2014, or 2024) by splitting at least one of a width and a height of the second coding unit 2022 having a size of N×N/2. That is, the image decoding device 200 may determine the third coding unit 2004 having a size of N/2×N/2 or the third coding unit 2014 having a size of N/2²×N/2 by splitting the second coding unit 2022 in a vertical direction, or the third coding unit 2024 having a size of N/2×N/2² by splitting the second coding unit 2022 in vertical and horizontal directions.

According to an embodiment, the image decoding device 200 may split a coding unit (for example, the first, second, or third coding unit 2000, 2002, or 2004) having a square shape in a horizontal or vertical direction. For example, the first coding unit 2010 having a size of N×2N may be determined by splitting the first coding unit 2000 having a size of 2N×2N in the vertical direction, or the first coding unit 2020 having a size of 2N×N may be determined by splitting the first coding unit 2000 in the horizontal direction. According to an embodiment, when a depth is determined based on a length of a longest side of a coding unit, a depth of a coding unit determined as the first coding unit 2000 having a size of 2N×2N is split in a horizontal or vertical direction may be the same as a depth of the first coding unit 2000.

According to an embodiment, the width and the height of the third coding unit 2014 or 2024 may be $\frac{1}{2}^2$ of those of the first coding unit 2010 or 2020. When the depth of the first coding unit 2010 or 2020 is D, the depth of the second coding unit 2012 or 2022 that is ½ of the width and the height of the first coding unit 2010 or 2020 may be D+1, and the depth of the third coding unit 2014 or 2024 that is $\frac{1}{2}^2$ of the width and the height of the first coding unit 2010 or 2020 may be D+2.

Figure 21:
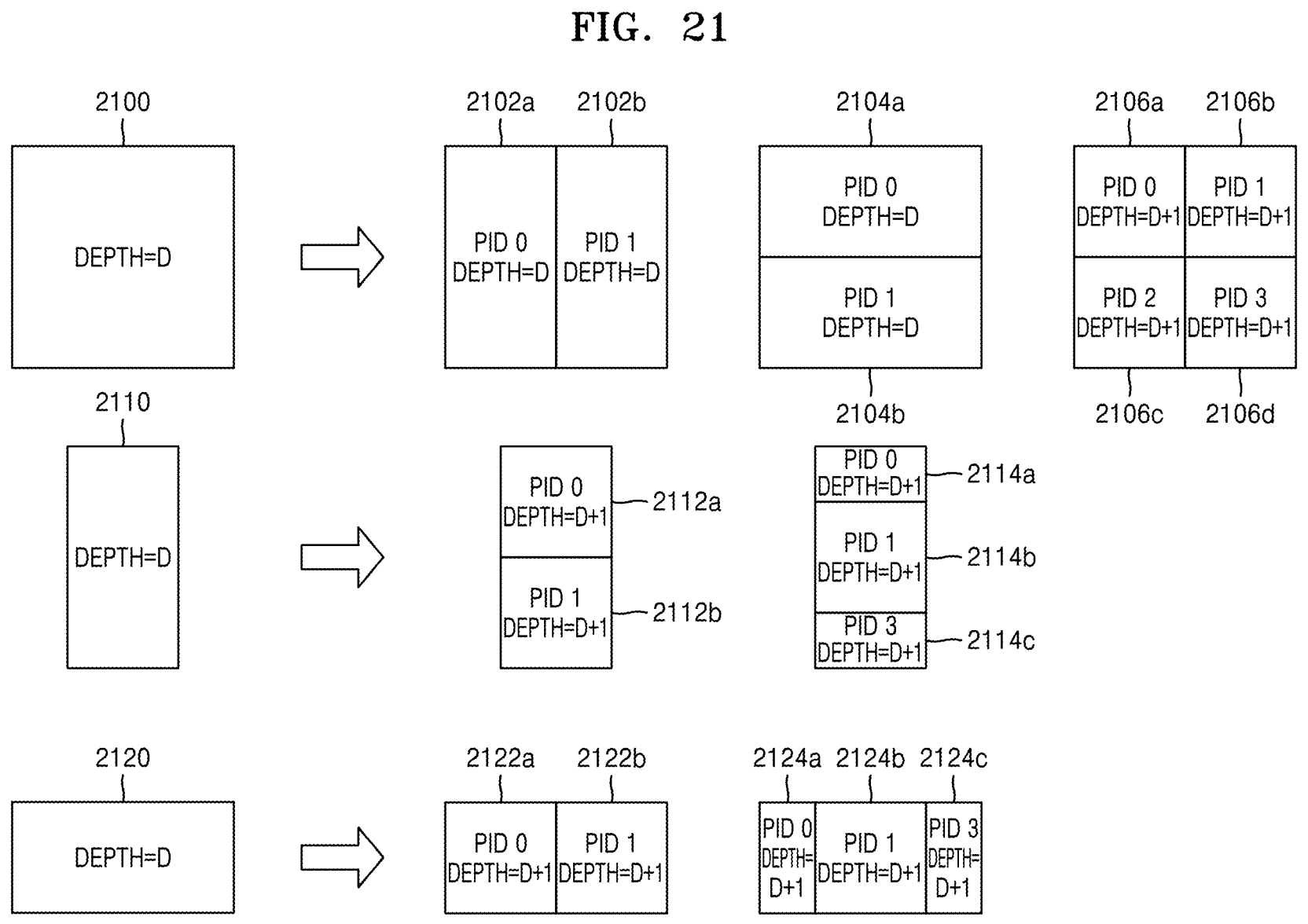

FIG. 21 illustrates a part index (PID) for distinguishing depths and coding units, which may be determined according to shapes and sizes of coding units, according to an embodiment.

According to an embodiment, the image decoding device 200 may determine a second coding unit having various shapes by splitting a first coding unit 2100 having a square shape. Referring to FIG. 21, the image decoding device 200 may determine second coding units 2102a and 2102b, 2104a and 2104b, or 2106a, 2106b, 2106c, and 2106d by splitting the first coding unit 2100 in at least one of a vertical direction and a horizontal direction, according to split shape information. That is, the image decoding device 200 may determine the second coding units 2102a and 2102b, 2104a and 2104b, or 2106a, 2106b, 2106c, and 2106d, based on split shape information of the first coding unit 2100.

According to an embodiment, a depth of the second coding units 2102a and 2102b, 2104a and 2104b, or 2106a, 2106b, 2106c, and 2106d determined according to the split shape information of the first coding unit 2100 having a square shape may be determined based on a length of a long side. For example, because a length of one side of the first coding unit 2100 having a square shape is the same as a length of a long side of the second coding units 2102a and 2102b or 2104a and 2104b having a non-square shape, the depths of the first coding unit 2100 and the second coding units 2102a and 2102b or 2104a and 2104b having a non-square shape may be the same, i.e., D. On the other hand, when the image decoding device 200 splits the first coding unit 2100 into the four second coding units 2106a, 2106b, 2106c, and 2106d having a square shape, based on the split shape information, a length of one side of the second coding units 2106a, 2106b, 2106c, and 2106d having a square shape is ½ of the length of one side of the first coding unit 2100, the depths of the second coding units 2106a, 2106b, 2106c, and 2106d may be D+1, i.e., a depth lower than the depth D of the first coding unit 2100.

According to an embodiment, the image decoding device 200 may split a first coding unit 2110, in which a height is longer than a width, in a horizontal direction into a plurality of second coding units 2112a and 2112b or 2114a, 2114b, and 2114c, according to split shape information. According to an embodiment, the image decoding device 200 may split a first coding unit 2120, in which a width is longer than a height, in a vertical direction into a plurality of second coding units 2122a and 2122b or 2114a, 2114b, and 2114c, according to split shape information.

According to an embodiment, depths of the second coding units 2112a and 2112b, 2114a, 2114b, and 2114c, 2122a and 2122b, or 2124a, 2124b, and 2124c determined according to the split shape information of the first coding unit 2110 or 2120 having a non-square shape may be determined based on a length of a long side. For example, because a length of one side of the second coding units 2112a and 2112b having a square shape is ½ of a length of a long side of the first coding unit 2110 having a non-square shape, in which the height is longer than the width, the depths of the second coding units 2112a and 2112b are D+1, i.e., depths lower than the depth D of the first coding unit 2110 having a non-square shape.

In addition, the image decoding device 200 may split the first coding unit 2110 having a non-square shape into an odd number of second coding units or 2114a, 2114b, and 2114c, based on split shape information. The odd number of second coding units or 2114a, 2114b, and 2114c may include the second coding units 2114a and 2114c having a non-square shape, and the second coding unit 2114b having a square shape. In this case, because a length of a long side of the second coding units 2114a and 2114c having a non-square shape and a length of one side of the second coding unit 2114b having a square shape are ½ of a length of one side of the first coding unit 2110, depths of the second coding units or 2114a, 2114b, and 2114c may be D+1, i.e., a depth lower than the depth D of the first coding unit 2110. The image decoding device 200 may determine depths of coding units related to the first coding unit 2120 having a non-square shape in which a width is longer than a height, in the same manner as determining depths of coding units related to the first coding unit 2110.

According to an embodiment, with respect to determining PIDs for distinguishing coding units, when an odd number of coding units do not have the same size, the image decoding device 200 may determine PIDs based on a size ratio of the coding units. Referring to FIG. 21, the second coding unit 2114b located at the center from the odd number of second coding units 2114a, 2114b, and 2114c may have the same width as the second coding units 2114a and 2114c, but have a height twice higher than those of the second coding units 2114a and 2114c. That is, the second coding unit 2114b located at the center may include two of the second coding units 2114a and 2114c. Accordingly, when the PID of the second coding unit 2114b located at the center is 1 according to a scan order, the PID of the second coding unit 2114c in a next order may be 3, the PID being increased by 2. That is, values of the PID may be discontinuous. According to an embodiment, the image decoding device 200 may determine whether an odd number of coding units has the same sizes based on discontinuity of PID for distinguishing the coding units.

According to an embodiment, the image decoding device 200 may determine whether a plurality of coding units determined as a current coding unit is split have certain split shapes based on values of PID. Referring to FIG. 21, the image decoding device 200 may determine the even number of second coding units 2112a and 211b or the odd number of second coding units 2114a, 2114b, and 2114c by splitting the first coding unit 2110 having a rectangular shape in which the height is longer than the width. The image decoding device 200 may use the PID indicating each coding unit so as to distinguish a plurality of coding units.

According to an embodiment, a PID may be obtained from a sample at a certain location (for example, an upper left sample) of each coding unit.

According to an embodiment, the image decoding device 200 may determine a coding unit at a certain location from among coding units determined by using PIDs for distinguishing coding units. According to an embodiment, when split shape information of the first coding unit 2110 having a rectangular shape in which a height is longer than a width indicates that the first coding unit 2110 is split into three coding units, the image decoding device 200 may split the first coding unit 2110 into the three second coding units 2114a, 2114b, and 2114c. The image decoding device 200 may assign a PID to each of the three second coding units 2114a, 2114b, and 2114c. The image decoding device 200 may compare PIDs of an odd number of coding units so as to determine a center coding unit from among the coding units. The image decoding device 200 may determine, as a coding unit at a center location from among coding units determined as the first coding unit 2110 is split, the second coding unit 2114b having a PID corresponding to a center value from among PIDs of the coding units. According to an embodiment, while determining PIDs for distinguishing coding units, when the coding units do not have the same sizes, the image decoding device 200 may determine PIDs based on a size ratio of the coding units. Referring to FIG. 21, the second coding unit 2114b generated as the first coding unit 2110 is split may have the same width as the second coding units 2114a and 2114c, but may have the height twice higher than those of the second coding units 2114a and 2114c. In this case, when the PID of the second coding unit 2114b located at the center is 1, the PID of the second coding unit 2114c in a next order may be 3, the PID increased by 2. In this manner, when an increasing range of PIDs differs while uniformly increasing, the image decoding device 200 may determine that a current coding unit is split into a plurality of coding units including a coding unit having a different size from other coding units. According to an embodiment, when split shape information indicates split into an odd number of coding units, the image decoding device 200 may split a current coding unit into a plurality of coding units, in which a coding unit at a certain location (for example, a center coding unit) have a size different from other coding units. In this case, the image decoding device 200 may determine the center coding unit having the different size by using PIDs of the coding units. However, a PID, and a size or location of a coding unit at a certain location described above are specified to describe an embodiment, and thus should not be limitedly interpreted, and various PIDs, and various locations and sizes of a coding unit may be used.

According to an embodiment, the image decoding device 200 may use a certain data unit from which recursive split of a coding unit is started.

Figure 22:
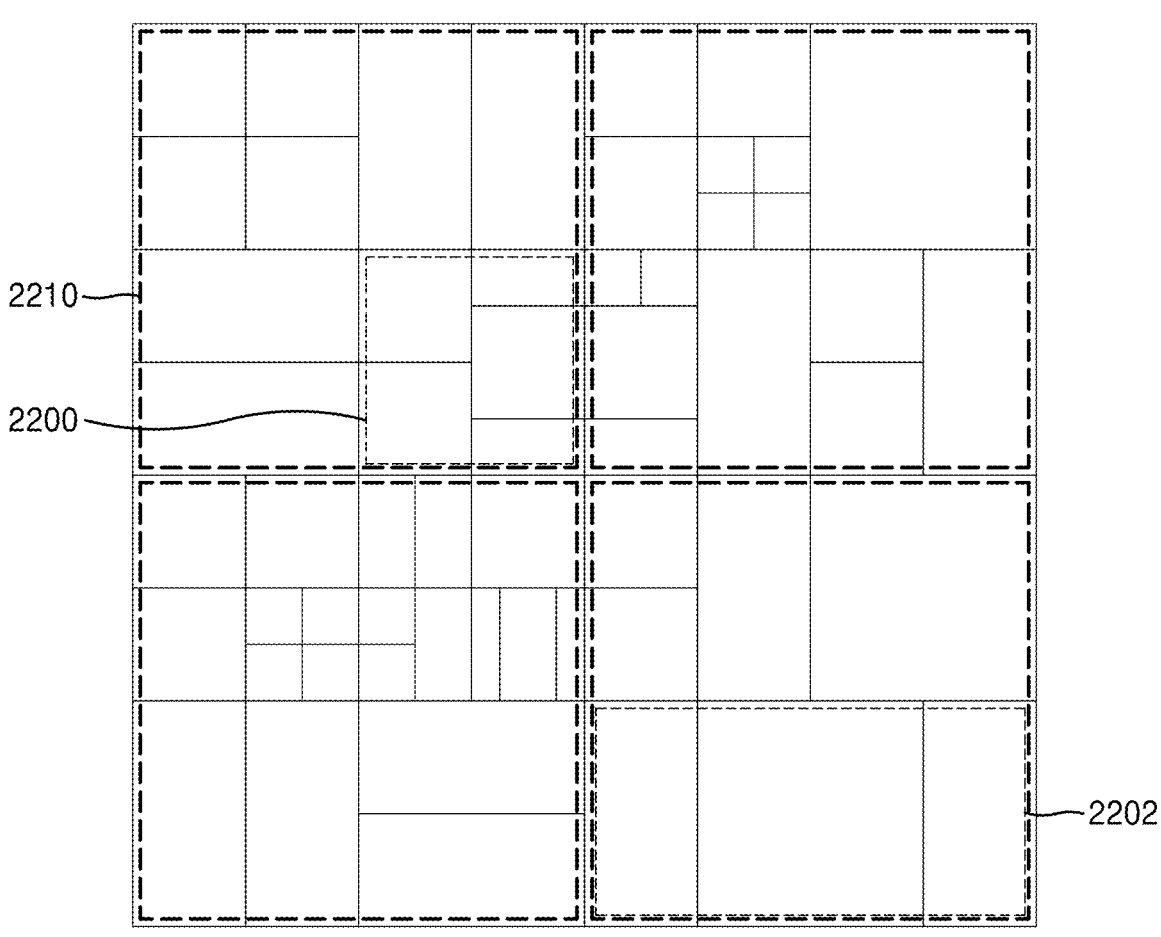
FIG. 22 illustrates that a plurality of coding units are determined according to a plurality of certain data units included in a picture, according to an embodiment.

FIG. 22 illustrates that a plurality of coding units are determined according to a plurality of certain data units included in a picture, according to an embodiment.

According to an embodiment, a certain data unit may be defined as a data unit from which a coding unit starts to be recursively split by using at least one of block shape information and split shape information. That is, the certain data unit may correspond to a coding unit of an uppermost depth used while determining a plurality of coding units by splitting a current picture. Hereinafter, the certain data unit is referred to as a reference data unit for convenience of description.

According to an embodiment, the reference data unit may indicate a certain size and shape. According to an embodiment, a reference coding unit may include M×N samples. Here, M and N may be the same, and may be an integer expressed as a multiple of 2. That is, the reference data unit may indicate a square shape or a non-square shape, and may later be split into an integer number of coding units.

According to an embodiment, the image decoding device 200 may split a current picture into a plurality of reference data units. According to an embodiment, the image decoding device 200 may split the plurality of reference data units obtained by splitting the current picture by using splitting information about each of the reference data units. Splitting processes of such reference data units may correspond to splitting processes using a quad-tree structure.

According to an embodiment, the image decoding device 200 may pre-determine a smallest size available for the reference data unit included in the current picture. Accordingly, the image decoding device 200 may determine the reference data unit having various sizes that are equal to or larger than the smallest size, and determine at least one coding unit based on the determined reference data unit by using block shape information and split shape information.

Referring to FIG. 22, the image decoding device 200 may use a reference coding unit 2200 having a square shape, or may use a reference coding unit 2202 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the receiver 210 of the image decoding device 200 may obtain, from a bitstream, at least one of information about a shape of a reference coding unit and information about a size of the reference coding unit, according to the various data units. Processes of determining at least one coding unit included in the reference coding unit 2200 having a square shape have been described above through processes of splitting the current coding unit 1000 of FIG. 10, and processes of determining at least one coding unit included in the reference coding unit 2202 having a non-square shape have been described above through processes of splitting the current coding unit 1100 or 1150 of FIG. 11, and thus details thereof are not provided again.

According to an embodiment, in order to determine a size and shape of a reference coding unit according to some data units pre-determined based on a predetermined condition, the image decoding device 200 may use a PID for distinguishing the size and shape of the reference coding unit. That is, the receiver 210 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding device 200 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit corresponding to the PID indicating the size and shape of the reference coding unit may be pre-determined. That is, the image decoding device 200 may select at least one of the pre-determined size and shape of the reference coding unit according to the PID so as to determine at least one of the size and shape of the reference coding unit included in a data unit that is a criterion for obtaining the PID.

According to an embodiment, the image decoding device 200 may use at least one reference coding unit included in one largest coding unit. That is, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the image decoding device 200 may determine a reference coding unit by splitting a largest coding unit n times according to a quad-tree structure, and split the reference coding unit based on at least one of block shape information and split shape information according to various embodiments.

Figure 23:
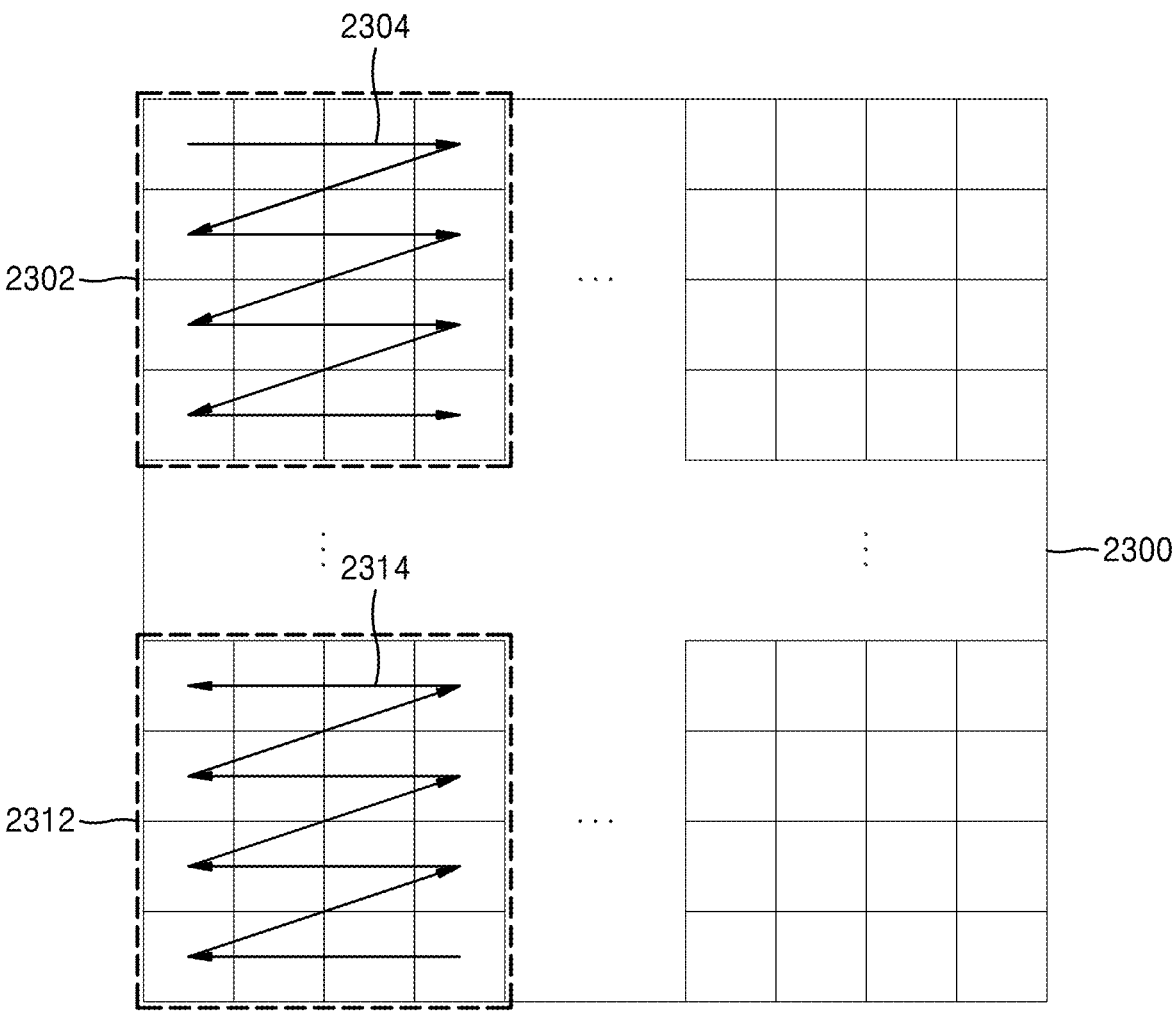
FIG. 23 illustrates a processing block serving as a criterion of determining a determination order of at least one reference coding units included in a picture, according to an embodiment.

FIG. 23 illustrates a processing block serving as a criterion of determining a determination order of reference coding units included in a picture 2300, according to an embodiment.

According to an embodiment, the image decoding device 200 may determine at least one processing block splitting a picture. A processing block is a data unit including at least one reference coding unit splitting an image, and the at least one reference coding unit included in the processing block may be determined in a certain order. In other word, a determining order of the at least one reference coding unit determined in each processing block may correspond to one of various orders for determining a reference coding unit, and may vary according to processing blocks. A determining order of reference coding units determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to an embodiment, the image decoding device 200 may determine a size of at least one processing block included in an image by obtaining information about a size of a processing block. The image decoding device 200 may obtain, from a bitstream, the information about a size of a processing block to determine the size of the at least one processing block included in the image. The size of the processing block may be a certain size of a data unit indicated by the information about a size of a processing block.

According to an embodiment, the receiver 210 of the image decoding device 200 may obtain, from the bitstream, the information about a size of a processing block according to certain data units. For example, the information about a size of a processing block may be obtained from the bitstream in data units of images, sequences, pictures, slices, and slice segments. That is, the receiver 210 may obtain, from the bitstream, the information about a size of a processing block according to such several data units, and the image decoding device 200 may determine the size of at least one processing block splitting the picture by using the obtained information about a size of a processing block, wherein the size of the processing block may be an integer times a size of a reference coding unit.

According to an embodiment, the image decoding device 200 may determine sizes of processing blocks 2302 and 2312 included in the picture 2300. For example, the image decoding device 200 may determine a size of a processing block based on information about a size of a processing block, the information obtained from a bitstream. Referring to FIG. 23, the image decoding device 200 may determine horizontal sizes of the processing blocks 2302 and 2312 to be four times a horizontal size of a reference coding unit, and a vertical size thereof to be four times a vertical size of the reference coding unit, according to an embodiment. The image decoding device 200 may determine a determining order of at least one reference coding unit in at least one processing block.

According to an embodiment, the image decoding device 200 may determine each of the processing blocks 2302 and 2312 included in the picture 2300 based on a size of a processing block, and determine a determining order of at least one reference coding unit included in each of the processing blocks 2302 and 2312. According to an embodiment, determining of a reference coding unit may include determining of a size of the reference coding unit.

According to an embodiment, the image decoding device 200 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. That is, an order of determining reference coding units may be independently determined per processing block.

According to an embodiment, the image decoding device 200 may obtain, from a bitstream, information about a determining order of a reference coding unit according to certain data units. For example, the receiver 210 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding device 200 may determine at least one reference coding unit based on the determined order.

According to an embodiment, the receiver 210 may obtain, from the bitstream, information about a determining order of a reference coding unit, as information related to the processing blocks 2302 and 2312, and the image decoding device 200 may determine an order of determining at least one reference coding unit included in the processing blocks 2302 and 2312 and determine at least one reference coding unit included in the picture 2300 according to a determining order of a coding unit. Referring to FIG. 23, the image decoding device 200 may determine determining orders 2304 and 2314 of at least one reference coding unit respectively related to the processing blocks 2302 and 2312. For example, when information about a determining order of a reference coding unit is obtained per processing block, determining orders of a reference coding unit related to the processing blocks 2302 and 2312 may be different from each other. When the determining order 2304 related to the processing block 2302 is a raster scan order, reference coding units included in the processing block 2302 may be determined according to the raster scan order. On the other hand, when the determining order 2314 related to the processing block 2312 is an inverse order of a raster scan order, reference coding units included in the processing block 2312 may be determined in the inverse order of the raster scan order.

The image decoding device 200 may decode determined at least one reference coding unit, according to an embodiment. The image decoding device 200 may decode an image based on reference coding units determined through above embodiments. Examples of a method of decoding a reference coding unit may include various methods of decoding an image.

According to an embodiment, the image decoding device 200 may obtain, from a bitstream, and use block shape information indicating a shape of a current coding unit or split shape information indicating a method of splitting the current coding unit. The block shape information or the split shape information may be included in a bitstream related to various data units. For example, the image decoding device 200 may use the block shape information or split shape information, which is included in a sequence parameter set, a picture parameter set, a video parameter set, a slice header, and a slice segment header. In addition, the image decoding device 200 may obtain, from a bitstream, and use syntax corresponding to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

What is claimed is:

1. A method of decoding an image by using a block map, the method comprising:

splitting an upper block into a plurality of blocks in a vertical direction according to split information of the upper block, wherein the plurality of blocks include a left block, a current block and a right block which are arranged in order from left to right;

determining that the current block is not allowed to be split into two lower blocks in the vertical direction which is a split direction of the upper block determined based on the split information of the upper block, without obtaining split information of the current block from a bitstream;

obtaining, from the bitstream, the split information of the current block indicating whether the current block is split into two lower blocks or three lower blocks in a horizontal direction which is a split direction different from the split direction of the upper block determined based on the split information of the upper block;

when the split information indicates that the current block is split into the two lower blocks in the horizontal direction, splitting the current block into a first lower block and a second lower block in the horizontal direction which is the split direction different from the split direction of the upper block determined based on the split information of the upper block;

when the first lower block is decoded, updating the block map with a value indicating that the first lower block is available as a neighboring lower block; and decoding the second lower block using the block map, wherein the block map is determined with regard to a maximum coding unit including the upper block.

2. A method of encoding an image by using a block map, the method comprising:

splitting an upper block into a plurality of blocks in a vertical direction according to split information of the upper block, wherein the plurality of blocks include a left block, a current block and a right block which are arranged in order from left to right;

determining that the current block is not allowed to be split into two lower blocks in the vertical direction which is a split direction of the upper block determined based on the split information of the upper block, without generating split information of the current block;

generating the split information of the current block indicating whether the current block is split into two lower blocks or three lower blocks in a horizontal direction which is a split direction different from the split direction of the upper block determined based on the split information of the upper block;

when the split information indicates that the current block is split into the two lower blocks in the horizontal direction, splitting the current block into a first lower block and a second lower block in the horizontal direction which is the split direction different from the split direction of the upper block determined based on the split information of the upper block;

when the first lower block is encoded, updating the block map with a value indicating that the first lower block is available as a neighboring lower block; and encoding the second lower block using the block map, wherein the block map is determined with regard to a maximum coding unit including the upper block.

3. A non-transitory computer-readable medium for recording a bitstream, the bitstream comprising:

split information of a current block, wherein the split information of the current block is obtained by:

splitting an upper block into a plurality of blocks in a vertical direction according to split information of the upper block, wherein the plurality of blocks include a left block, the current block and a right block which are arranged in order from left to right;

determining that the current block is not allowed to be split into two lower blocks in the vertical direction which is a split direction of the upper block determined based on the split information of the upper block, without generating the split information of the current block;

generating the split information of the current block indicating whether the current block is split into two lower blocks or three lower blocks in a horizontal direction which is a split direction different from the split direction of the upper block determined based on the split information of the upper block;

when the split information indicates that the current block is split into the two lower blocks in the horizontal direction, splitting the current block into a first lower block and a second lower block in the horizontal direction which is the split direction different from the split direction of the upper block determined based on the split information of the upper block;

when the first lower block is encoded, updating a block map with a value indicating that the first lower block is available as a neighboring lower block; and encoding the second lower block using the block map, wherein the block map is determined with regard to a maximum coding unit including the upper block.

\* \* \* \* \*